United States Patent
Anelle

(10) Patent No.: US 11,454,959 B2
(45) Date of Patent: Sep. 27, 2022

(54) PRODUCT MANUFACTURING WITH A MANUFACTURING PRODUCT AND PROCESS STRUCTURE

(71) Applicant: The Boeing Company, Chicago, IL (US)

(72) Inventor: Joseph Anelle, Weldon Spring, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/025,979

(22) Filed: Sep. 18, 2020

(65) Prior Publication Data

US 2021/0181727 A1 Jun. 17, 2021

Related U.S. Application Data

(60) Provisional application No. 62/947,298, filed on Dec. 12, 2019.

(51) Int. Cl.
*G05B 19/418* (2006.01)
(52) U.S. Cl.
CPC ... *G05B 19/41885* (2013.01); *G05B 19/4188* (2013.01); *G05B 19/41805* (2013.01)
(58) Field of Classification Search
CPC ........ G05B 19/41885; G05B 19/41805; G05B 19/4188; G05B 2219/31342; G05B 2219/32084; G05B 2219/35081; G05B 19/4097; Y02P 90/02
See application file for complete search history.

(56) References Cited

U.S. PATENT DOCUMENTS

| | | | |
|---|---|---|---|
| 6,725,184 B1* | 4/2004 | Gadh | G05B 19/41805 703/22 |
| 7,321,804 B2 | 1/2008 | Zayic et al. | |
| 7,343,209 B2 | 3/2008 | Anelle | |
| 2004/0098151 A1* | 5/2004 | Carlucci | G06F 30/00 700/95 |
| 2006/0259172 A1* | 11/2006 | Trammell | G06Q 30/0603 700/97 |
| 2009/0069920 A1* | 3/2009 | Franzen | G06Q 10/06 700/97 |

OTHER PUBLICATIONS

Jianzhong Mo, Qiong Zhang, and Rajit Gadh, "Virtual Disassembly," International Journal of CAD/CAM, vol. 2, No. 1, pp. 29-37 (2002) (Year: 2002).*

* cited by examiner

*Primary Examiner* — Christopher E. Everett
(74) *Attorney, Agent, or Firm* — Yee & Associates, P.C.

(57) ABSTRACT

A method, apparatus, system, and computer program product for managing a product. An engineering product structure for the product is identified. The engineering product structure comprises parts for the product. A manufacturing product and process structure is created using the engineering product structure, wherein the manufacturing product and process structure comprises the parts and manufacturing information for connecting the parts to each other to form the product.

20 Claims, 17 Drawing Sheets

PRODUCT MANUFACTURING WITH A MANUFACTURING PRODUCT AND PROCESS STRUCTURE

RELATED PROVISIONAL APPLICATION

This application is related to and claims the benefit of priority of provisional U.S. Patent Application Ser. No. 62/947,298 entitled "Product Manufacturing with a Manufacturing Product and Process Structure", filed on Dec. 12, 2019, which is hereby incorporated by reference.

BACKGROUND INFORMATION

1. Field

The present disclosure relates generally to manufacturing products and, in particular, to a method, apparatus, system, and computer program product for generating a manufacturing product structure for a product from a three-dimensional model for a product.

2. Background

In developing products, designs are created for the products. When the designs are finalized, the designs can be used to manufacture the products. For example, with a complex product such as an aircraft, a design of the aircraft can be made using computer-aided design software. The computer-aided design software can be used to create a design of the aircraft in the form of a three-dimensional model. The three-dimensional model of the aircraft can be comprised of many three-dimensional models of different assemblies, subassemblies, structures, and parts for components that form the aircraft. These models also include information such as dimensions, materials, tolerances, processes, and other information about the aircraft.

These models are engineering designs that focus on how the aircraft and the different components for the aircraft function. These models are often referred to as computer-aided design (CAD) models.

These computer-aided design models can be used to manufacture the aircraft. For example, engineers and other human operators can use computer-aided manufacturing (CAM) software to create processes and instructions for manufacturing the parts of the aircraft and to assemble the aircraft from the models for the aircraft. Creating the processes and instructions for manufacturing the aircraft can be more time-consuming and labor-intensive than desired.

SUMMARY

An embodiment of the present disclosure provides a product manufacturing system comprising a computer system and a product manager in the computer system. The product manager is configured to identify an engineering product structure for a product. The engineering product structure comprises parts for the product. The product manager is configured to create a manufacturing product and process structure using the engineering product structure. The manufacturing product and process structure comprises the parts and manufacturing information for connecting the parts to each other to form the product, wherein the manufacturing product and process structure is employable to facilitate assembly of the product.

Another embodiment of the present disclosure provides a method for managing a product. An engineering product structure for the product is identified by a computer system. The engineering product structure comprises parts for the product. A manufacturing product and process structure is created by the computer system using the engineering product structure, wherein the manufacturing product and process structure comprises the parts and manufacturing information for connecting the parts to each other to form the product.

Yet another embodiment of the present disclosure provides a computer program product for managing a product. The computer program product comprises a computer-readable storage media with first program code and second program code stored on the computer-readable storage media. The first program code is executable by a computer system to cause the computer system to identify an engineering product structure for the product, wherein the engineering product structure comprises parts for the product. The second program code is executable by the computer system to cause the computer system to create a manufacturing product and process structure using the engineering product structure. The manufacturing product and process structure comprises the parts and manufacturing information for connecting the parts to each other to form the product.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current applications enable viewing a three-dimensional model. Further, the illustrative embodiments recognize and take into account that these applications can also display an exploded view of a three-dimensional model.

The illustrative embodiments recognize and take into account that currently available applications can only provide a visualization of the product. For example, the illustrative embodiments recognize and take into account that this visualization does not provide an idea of how parts should be grouped for assembly of the product.

Further, the illustrative embodiments recognize and take into account that exploded views by currently available applications do not provide or describe how the parts fit with each other or the order in which the parts should be assembled for manufacturing the product. For example, the illustrative embodiments recognize and take into account that an order assembly can be important. For example, the illustrative embodiments recognize and take into account that connecting part A to part B before connecting part C to part A may make it impossible to connect part C to part A because part B, when connected to part A, blocks the path to the connection location on part A or blocks the connection location on part A.

The illustrative embodiments recognize and take into account that, currently, human operators viewing the design of the product create instructions for assembling the parts for a product based on the visualization of the design. The illustrative embodiments recognize and take into account that this process can be more time-consuming and labor-intensive than desired. Therefore, it would be desirable to have a method and apparatus that take into account at least some of the issues discussed above, as well as other possible issues.

Figure 1:
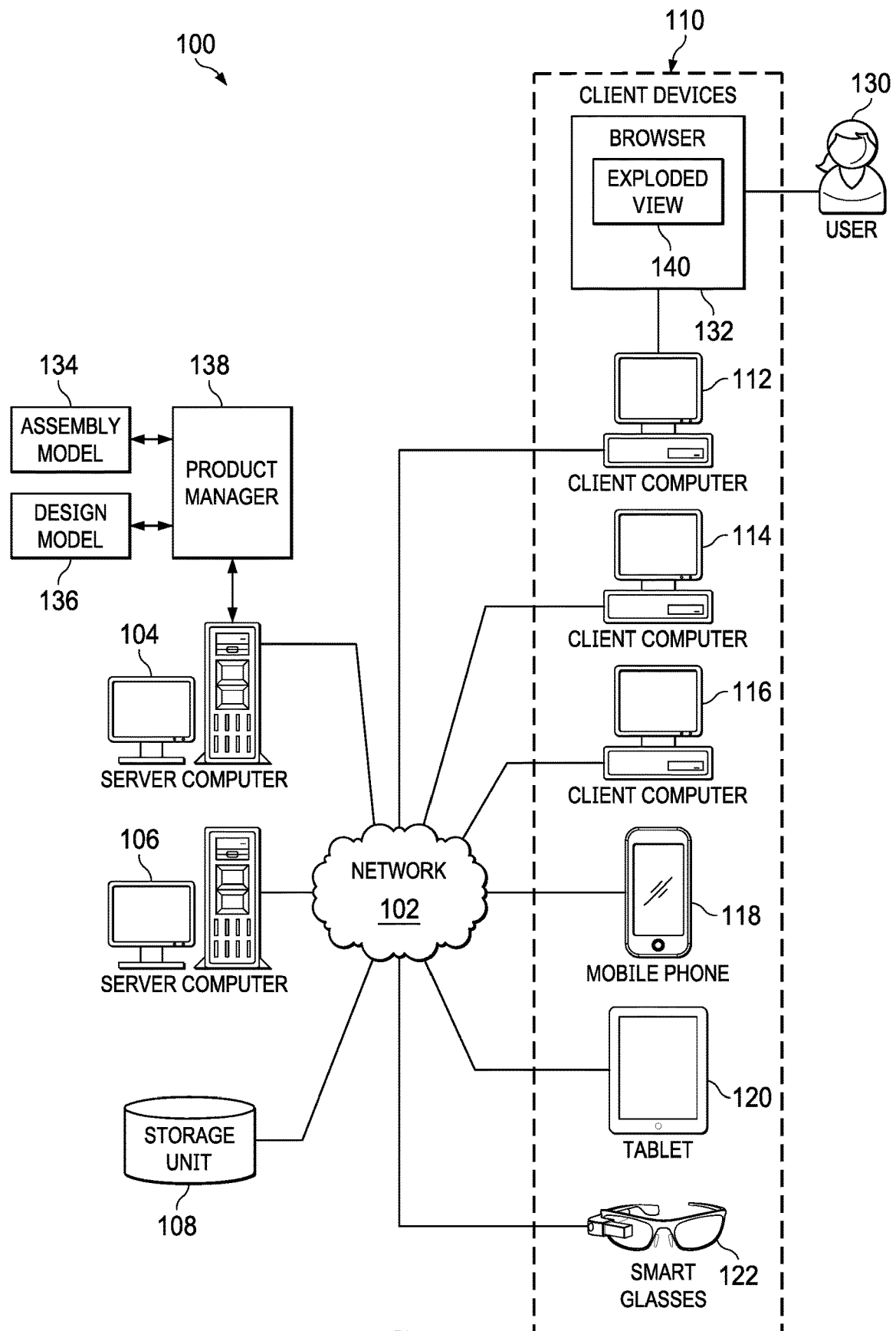
FIG. 1 is a pictorial representation of an example network of data processing systems in which illustrative embodiments can be implemented.

With reference now to the figures and, in particular, with reference to FIG. 1, a pictorial representation of an example network of data processing systems is depicted in which illustrative embodiments can be implemented. Network data processing system 100 is a network of computers in which the illustrative embodiments can be implemented. Network data processing system 100 comprises network 102, which is the medium used to provide communications links between various devices and computers connected together within network data processing system 100. Network 102 can include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 can form an Internet-of-things (IoT) in which these physical devices can connect to network 102 and exchange information with each other over network 102.

Client devices 110 are clients to server computer 104 in this example. Network data processing system 100 can include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also can be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list can be needed. In other words, "at least one of" means any combination of items and number of items can be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 130 can operate in browser 132 to create assembly model 134 from design model 136. In this illustrative example, product manager 138 in server computer 104 manages models such as design model 136 and assembly model 134.

Assembly model 134 is a model that can be used to manufacture a product. In other words, assembly model 134 is organized in a manner that is conducive to or aids in the manufacturing of the product. Design model 136 is a model, such as a computer-aided design (CAD) model. Design model 136 can be created by user 130 or other users when generating a design of the product. Design model 136 provides a visualization of the product. However, design model 136 may not be optimized for use in manufacturing the product. In converting design model 136 into assembly model 134, product manager 138 can make changes to at least one of how parts are organized or associated with each other.

In this illustrative example, a multitude of processes can be performed to assemble a product. Product manager 138 can automatically identify groupings of parts that are used in each of the processes to assemble the product. Product manager 138 can associate the parts in the groupings in which each grouping can be for a particular process performed to assemble a portion of the product.

Further, the groupings of the parts in assembly model 134 can be displayed in exploded view 140 on browser 132. As depicted, exploded view 140 is based on the organization or associations of the parts in assembly model 134. In this example, user 130 can re-assign the parts in assembly model 134 in which the parts are exploded away from one another to reveal an assembly or installation paths. These paths are displayed in exploded view 140 in a manner that provides a visualization of the interdependencies of the parts. As a result, exploded view 140 can also convey a global assembly structure of a depicted object and local spatial relationships between the parts for the product.

With this visualization of the product in exploded view 140, user 130 can make adjustments to the groupings of the parts in assembly model 134 as needed. As a result, user 130 can find or correct errors that may have occurred when product manager 138 grouped the parts to form assembly model 134.

The illustration of network data processing system 100 in FIG. 1 is presented as an example of one manner in which illustrative embodiments can be implemented. For example, product manager 138 can be located on the same computer as browser 132. Further, assembly model 134 and design model 136 can be stored at a remote location such as storage unit 108. As another example, product manager 138 can also include processes to generate instructions for manufacturing a product from assembly model 134.

Figure 2:
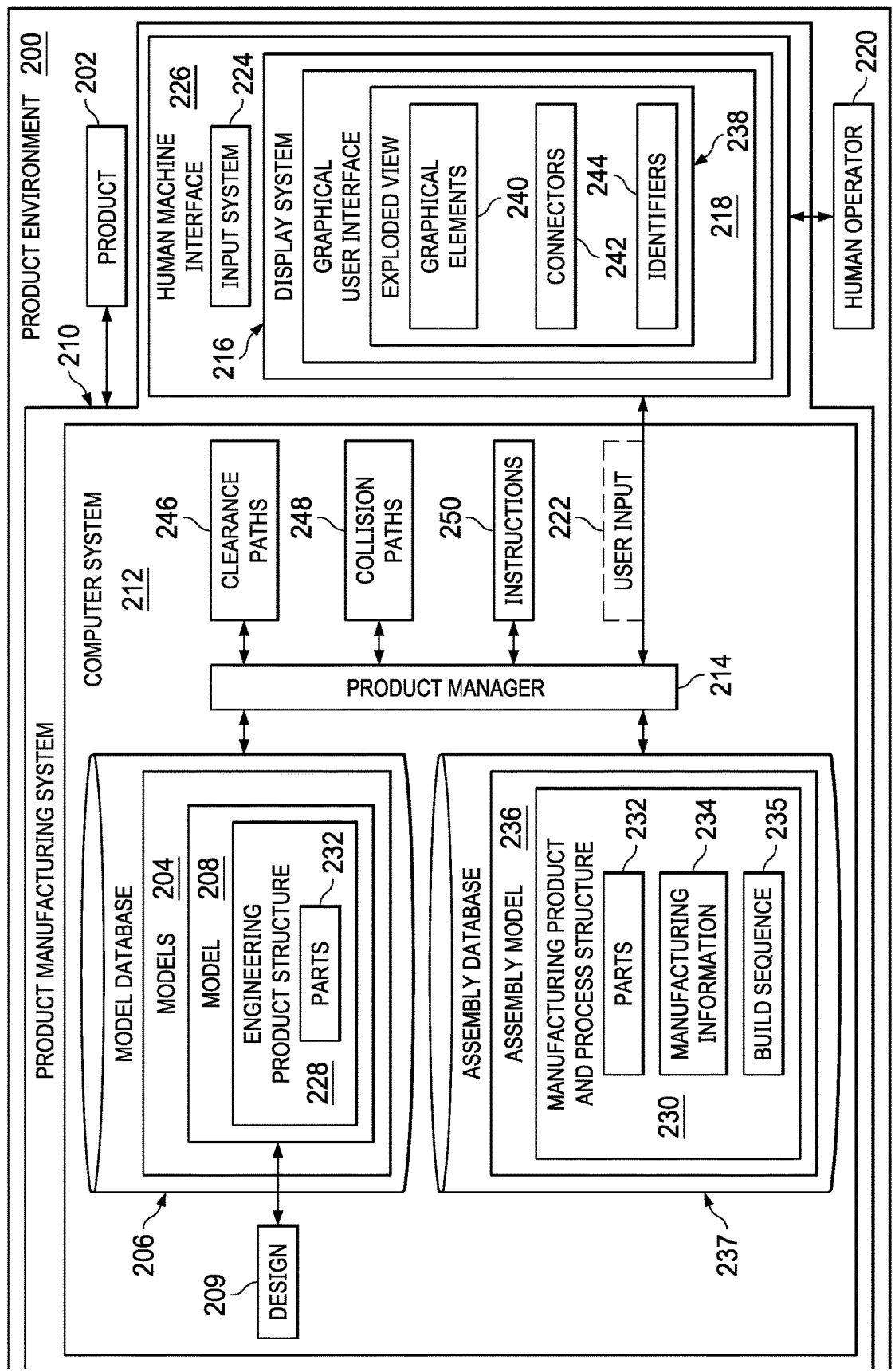
FIG. 2 is an illustration of an example product environment in accordance with an illustrative embodiment.

Turning next to FIG. 2, an illustration of an example product environment is depicted in accordance with an illustrative embodiment. In this illustrative example, product environment 200 includes components that can be implemented in hardware such as the hardware shown in network data processing system 100 in FIG. 1. As depicted, product environment 200 is an environment in which product 202 can be designed and manufactured.

In this illustrative example, product 202 can take a number of different forms. For example, product 202 can be one of a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a manufacturing facility, a building, an engine, a passenger seat, a skin panel, a door, an entertainment system, a wing, a brake system, an engine housing, and other suitable products.

As depicted, models 204 are stored in model database 206. Models 204 can be at least one of a two-dimensional model or a three-dimensional model.

One or more of models 204 can embody design 209 for product 202. In one illustrative example, one of models 204 can embody design 209 for product 202. In another illustrative example, design 209 for product 202 can be embodied in a plurality of models 204.

As depicted, product 202 can be manufactured from model 208 in models 204. In this illustrative example, model 208 can be all of product 202 or can be a portion of product 202 depending on the particular implementation.

As depicted, this manufacturing can be controlled by product manufacturing system 210. In this illustrative example, product manufacturing system 210 comprises computer system 212 and product manager 214 located in computer system 212.

As depicted, product manufacturing system 210 also includes display system 216. Display system 216 is a physical hardware system and includes one or more display devices on which graphical user interface 218 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 220 is a person that can interact with graphical user interface 218 through user input 222 generated by input system 224 for computer system 212. Input system 224 is a physical hardware system and can be selected from at least one of a mouse, a keyboard, a trackball, a touchscreen, a stylus, a motion sensing input device, a cyber glove, or some other suitable type of input device. Display system 216 and input system 224 form human machine interface (HMI) 226.

Human operator 220 can interact with product manager 214 through human machine interface 226 as part of a process for manufacturing product 202 from model 208. In this illustrative example, human operator 220 can select model 208 from models 204 for product 202. As depicted, model 208 embodies engineering product structure 228. Model 208 stores information in a computer-readable form. Engineering product structure 228 comprises parts 232. Engineering product structure 228 is a listing of parts 232 and can create connections between parts 232 and identify assemblies. However, an association of parts 232 with each other for assembly is not present in engineering product structure 228. The identification of parts 232 within an assembly or subassembly does not provide the connections or associations needed to assemble the assembly or subassembly.

In response to a selection of model 208, product manager 214 can create manufacturing product and process structure 230 from engineering product structure 228 described in model 208. As depicted, manufacturing product and process structure 230 is in a form that can be used to manufacture product 202. Manufacturing product and process structure 230 can also be referred to as an "as planned data structure".

Manufacturing product and process structure 230 comprises parts 232 and includes manufacturing information 234 for at least one of assembling parts 232 or fabricating parts 232. In this illustrative example, manufacturing information 234 includes build sequence 235. Build sequence 235 identifies an order in which parts 232 should be connected to each other.

When one component is "connected" to another component, the connection is a physical association. For example, a first component can be considered to be physically connected to a second component by at least one of being secured to the second component, bonded to the second component, mounted to the second component, welded to the second component, fastened to the second component, or connected to the second component in some other suitable manner. In another illustrative example, the first component can be connected to the second component by laying up composite materials for these two components and cure the composite materials.

The first component also can be connected to the second component using a third component. The first component can also be considered to be physically connected to the second component by being formed as part of the second component, an extension of the second component, or both.

In this illustrative example, manufacturing information 234 can also include at least one of a connection between parts 232, a clearance path, groupings of parts 232 for assembly, an assembly path, a process for assembling parts 232, a material, or other information used to perform at least one of fabricating or assembling parts 232. In the illustrative example, manufacturing product and process structure 230 provides a guide to assemble parts 232 for product 202 or a portion of product 202.

As depicted, manufacturing product and process structure 230 can be stored in assembly model 236 in assembly database 237. Assembly model 236 can be a two-dimensional or three-dimensional model of product 202.

In this illustrative example, manufacturing product and process structure 230 in assembly model 236 can be displayed to human operator 220 on human machine interface 226.

The display in graphical user interface 218 can be in the form of exploded view 238. As depicted, exploded view 238 can provide a visualization of manufacturing information 234 with respect to parts 232. For example, exploded view 238 can include graphical elements 240, connectors 242, and identifiers 244 for parts 232 displayed in exploded view 238.

As depicted, graphical elements 240 represent parts 232. Graphical elements 240 can provide a visualization of parts 232 when displayed in exploded view 238 in human machine interface 226.

In the illustrative example, connectors 242 can be graphical indicators that identify an association between parts 232 displayed in exploded view 238. Identifiers 244 can be graphical indicators that identify parts 232 displayed in exploded view 238.

As depicted, exploded view 238 differs from currently available exploded views. For example, exploded view 238 includes connectors 242, which can be used to identify an order assembly for parts 232.

The generation of manufacturing product and process structure 230 from engineering product structure 228 in the display of manufacturing product and process structure 230 in exploded view 238 can be performed using clearance paths 246 and collision paths 248. In this example, clearance paths 246 can indicate what paths are available for connecting parts 232 to each other for a particular build sequence and assembling of parts 232. Further, clearance paths 246 can provide a visualization of interdependencies between parts 232 in graphical user interface 218.

The build sequence identifies an order in which parts 232 are to be connected to each other to build product 202. In the illustrative example, collision paths 248 can indicate what paths result in exclusion or inability to connect a part to other parts for a particular build sequence. Collision paths 248 can be visualized in graphical user interface 218 on display system 216.

With the visualization of manufacturing product and process structure 230, human operator 220 can make changes to manufacturing product and process structure 230. For example, human operator 220 can interact with exploded view 238 of manufacturing product and process structure 230 displayed in graphical user interface 218 in human machine interface 226.

This interaction can generate user input 222 that can change at least one of a grouping of parts 232, a build sequence for parts 232, connectors 242 between parts 232, or other changes to manufacturing product and process structure 230 through the interaction with exploded view 238 of manufacturing product and process structure 230. In this manner, human operator 220 can interact with the visualization of data structures in a manner that can be more intuitive and easier to perform for human operator 220.

In illustrative example, parts 232 can be grouped based on how parts 232 are assembled based on build sequence 235. For example, parts 232 can be grouped in a group that is based on connecting the parts to each other for a subassembly. As a result, those parts that are used in a process in build sequence 235 for a particular assembly of parts 232 may not be grouped together in engineering product structure 228. This grouping can be made to group these parts together in manufacturing product and process structure 230.

When human operator 220 is satisfied with manufacturing product and process structure 230, this data structure is complete and can be used to manufacture product 202. For example, manufacturing product and process structure 230 can be used to generate instructions 250 for use in assembling product 202. In other words, instructions 250 can be used to connect parts 232 to each other in a particular sequence as build sequence 235.

Instructions 250 can take a number of different forms. For example, instructions 250 can be written instructions (e.g., displayed and/or printed via an output device) explaining steps in assembling product 202. In another illustrative example, instructions 250 can be in the form of a multimedia presentation that includes a display of a step-by-step process for assembling parts 232 to form product 202. This display can also include a visualization that explains the assembly sequence to human operator 220.

In another illustrative example, instructions 250 can be instructions that are computer-readable instructions used by a computer in computer system 212 or some other location to operate to assemble product 202.

Product manager 214 can be implemented in software, hardware, firmware, or a combination thereof. When software is used, the operations performed by product manager 214 can be implemented in program code configured to run on hardware, such as a processor unit. When firmware is used, the operations performed by product manager 214 can be implemented in program code and data and stored in persistent memory to run on a processor unit. When hardware is employed, the hardware can include circuits that operate to perform the operations in product manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

In one illustrative example, one or more technical solutions are present that overcome a technical problem with generating instructions for manufacturing a product. As a result, one or more technical solutions can provide a technical effect of generating a manufacturing product and process structure from an engineering product structure in which the manufacturing product and process structure includes information for manufacturing the product. This information can include a build sequence in which parts are to be connected to each other. For example, the build sequence can identify a group of parts that is to be assembled to form a subassembly. The subassembly can then be assembled with other parts for subassemblies to form an assembly for the product.

Computer system 212 can be configured to perform at least one of the steps, operations, or actions described in the different illustrative examples using software, hardware, firmware, or a combination thereof. As a result, computer system 212 operates as a special purpose computer system in which product manager 214 in computer system 212 enables creating manufacturing product and process structure 230 that can be used to manufacture a product. In particular, product manager 214 transforms computer system 212 into a special purpose computer system as compared to currently available general computer systems that do not have product manager 214.

Figure 3:
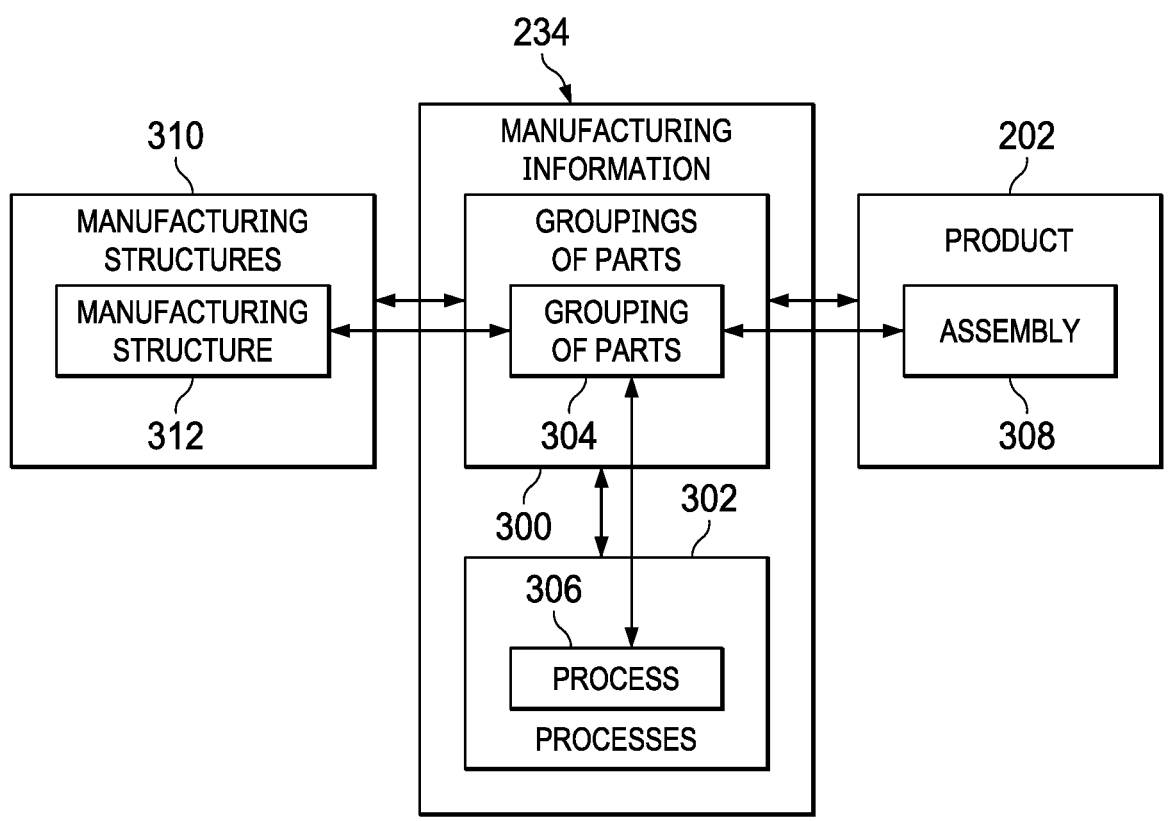
FIG. 3 is an illustration of an example block diagram of manufacturing information in accordance with an illustrative embodiment.

With reference now to FIG. 3, an illustration of an example block diagram of manufacturing information is depicted in accordance with an illustrative embodiment. As depicted, manufacturing information 234 includes number of groupings of parts 300 and a number of processes 302. One or more processes comprising operations for assembling parts can be present. The number of processes 302 can be based on build sequence 235 in FIG. 2, which defines an order in which parts 232 in FIG. 2 should be connected to each other.

In this illustrative example, each grouping of parts 304 can be based on process 306 in processes 302. For example, grouping of parts 304 can be made by identifying parts that are needed to perform operations in process 306 to build assembly 308 for product 202. In this example, assembly 308 can include one or more subassemblies that have been previously assembled.

In the illustrative example, groupings of parts 300 form manufacturing structures 310. Each of manufacturing structures 310 can be built using a process in processes 302. For example, grouping of parts 304 forms manufacturing structure 312 that can be built using process 306.

For example, grouping of parts 304 for manufacturing structure 312 can include fasteners and three structures. In this example, process 306 defines operations to be performed to connect the three structures to each other using the fasteners.

Figure 4:
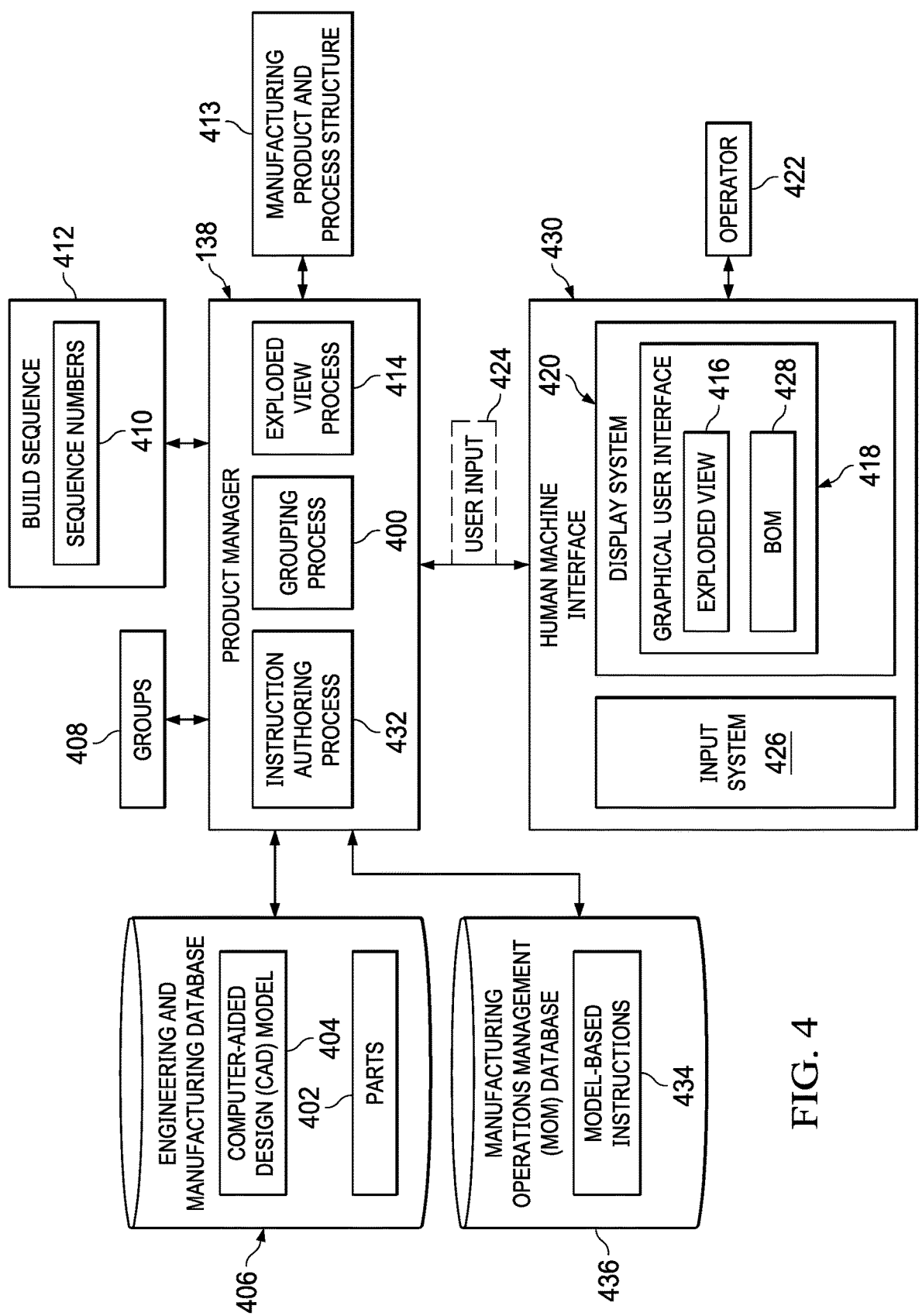
FIG. 4 is an illustration of an example product manager in accordance with an illustrative embodiment.

With reference next to FIG. 4, an illustration of an example product manager is depicted in accordance with an illustrative embodiment. Product manager 214 includes a number of different components.

For example, product manager 214 includes grouping process 400 that performs automatic assignments of parts 402 in computer-aided design (CAD) model 404 in engineering and manufacturing database 406 to groups 408.

Computer-aided design model 404 is an example of model 208 in FIG. 2. In this depicted example, engineering and manufacturing database 406 can function as a repository for plans, bills of materials (BOMs), process specifications, business requirements, and manufacturing requirements in addition to three-dimensional models such as CAD model 404.

In this illustrative example, grouping process 400 can generate groups 408 from parts 402 based on processes used to build assemblies for the product represented by CAD model 404 using parts 402. In this illustrative example, sequence numbers 410 are for build sequence 412 that indicates the order in which parts are assembled to build the product.

In this illustrative example, all of the parts in parts 402 having the same sequence number are part of the same process for building and assembly. As a result, all of parts 402 having the same sequence number in sequence numbers 410 are grouped together in a group in groups 408.

In this illustrative example, fasteners can be grouped together to form a part. In other words, a group of fasteners can be treated as a part. In this illustrative example, the fasteners grouped together and other parts are assigned the same sequence number. The sequence number can be used to designate the different parts used in the same operation in a process to assemble the product.

In this illustrative example, parts 402 are not assigned a sequence number until both the fastener-based grouping and the explosion of the parts with part trajectories are performed. Sequence numbers 410 are used to reorder parts 402 in an engineering product structure 228 to create manufacturing product and process structure 413.

In the illustrative example, product manager 138 can use fastener-based grouping to identify groupings of fasteners in addition to other parts that the fasteners can be used to connect to each other to build an assembly. In the illustrative example, the fasteners can be grouped with the grouping represented in a manner similar to a part for grouping in groups 408. The groupings of the fasteners and other parts can be placed into a group in groups 408.

The groupings of the fasteners can be identified using a fastener data scheme as well as manufacturing requirements used to build assemblies using the fasteners and other parts. This information can be used to identify what fasteners are needed for a particular assembly.

In this illustrative example, grouping process 400 can generate manufacturing product and process structure 413 using groups 408. Each group in groups 408 can form a manufacturing structure in manufacturing product and process structure 413. Each manufacturing structure is formed of a process used to build an assembly for the product. A manufacturing structure can also be referred to as an assembly or a manufacturing assembly in the illustrative examples.

In this illustrative example, product manager 138 also includes exploded view process 414. This process generates and displays exploded view 416 on graphical user interface 418 and display system 420 to operator 422.

Display system 420 is a physical hardware system and includes one or more display devices on which graphical user interface 418 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Operator 422 is a person that can interact with graphical user interface 418 through user input 424 generated by input system 426 for a computer system. Input system 426 is a physical hardware system and can be selected from at least one of a mouse, a keyboard, a trackball, a touchscreen, a stylus, a motion sensing input device, a gesture detection device, a cyber glove, or some other suitable type of input device. Display system 420 and input system 426 form human machine interface (HMI) 430.

In this illustrative example, exploded view 416 is an exploded view of parts 402 in CAD model 404. Exploded view 416 can indicate groupings of parts 402 based on processes used to build assemblies with parts 402. These indications can be made with graphical indicators. A graphical indicator can be selected from one of a color, an icon, a font, a line thickness, or other types of graphical indicators that can be used to associate parts with a particular group in groups 408.

With input system 426, operator 422 can make adjustments to the grouping of parts 402 in exploded view 416. In another example, based on the visualization of exploded view 416, operator 422 can make changes to groupings in bill of materials 428 displayed in graphical user interface 418. For example, bill of materials 428 can display a listing of parts 402 in the groupings to which those parts belong. For example, parts 402 can be displayed in association with identifications of manufacturing structures.

In this illustrative example, product manager 138 can also include instruction authoring process 432. This process can generate model-based instructions 434 for use in manufacturing the product. These instructions can take different forms and can be stored in manufacturing operations management (MOM) database 436. This database can be a repository for information used to manufacture products. Further, this database can store all of the information for the product.

For example, model-based instructions 434 can be program code used by manufacturing equipment for automated assembly of parts to form assemblies. For example, model-based instructions 434 can be computer numerical control instructions used by computer numerical control machines.

In another example, model-based instructions 434 can be instructions used by human operators to assemble parts 402. These instructions can include words, diagrams, images, videos, and other information. These instructions can be distributed as work orders to human operators or used in assembling the product.

The illustration of product environment 200 and this different components in FIGS. 2-4 are not meant to imply physical or architectural limitations to the manner in which an illustrative embodiment can be implemented. Other components in addition to or in place of the ones illustrated can be used. Some components may be unnecessary. Also, the blocks are presented to illustrate some functional components. One or more of these blocks can be combined, divided, or combined and divided into different blocks when implemented in an illustrative embodiment.

For example, engineering and manufacturing database 406 and manufacturing operations management (MOM) database 436 are depicted as separate databases. In other illustrative examples, these databases can be combined into a single database. Further, each database can be distributed in separate locations. In yet another illustrative example, the different processes for product manager 138 illustrated in FIG. 4 can be located in one or more different computers in computer system 212 in FIG. 2.

Figure 5:
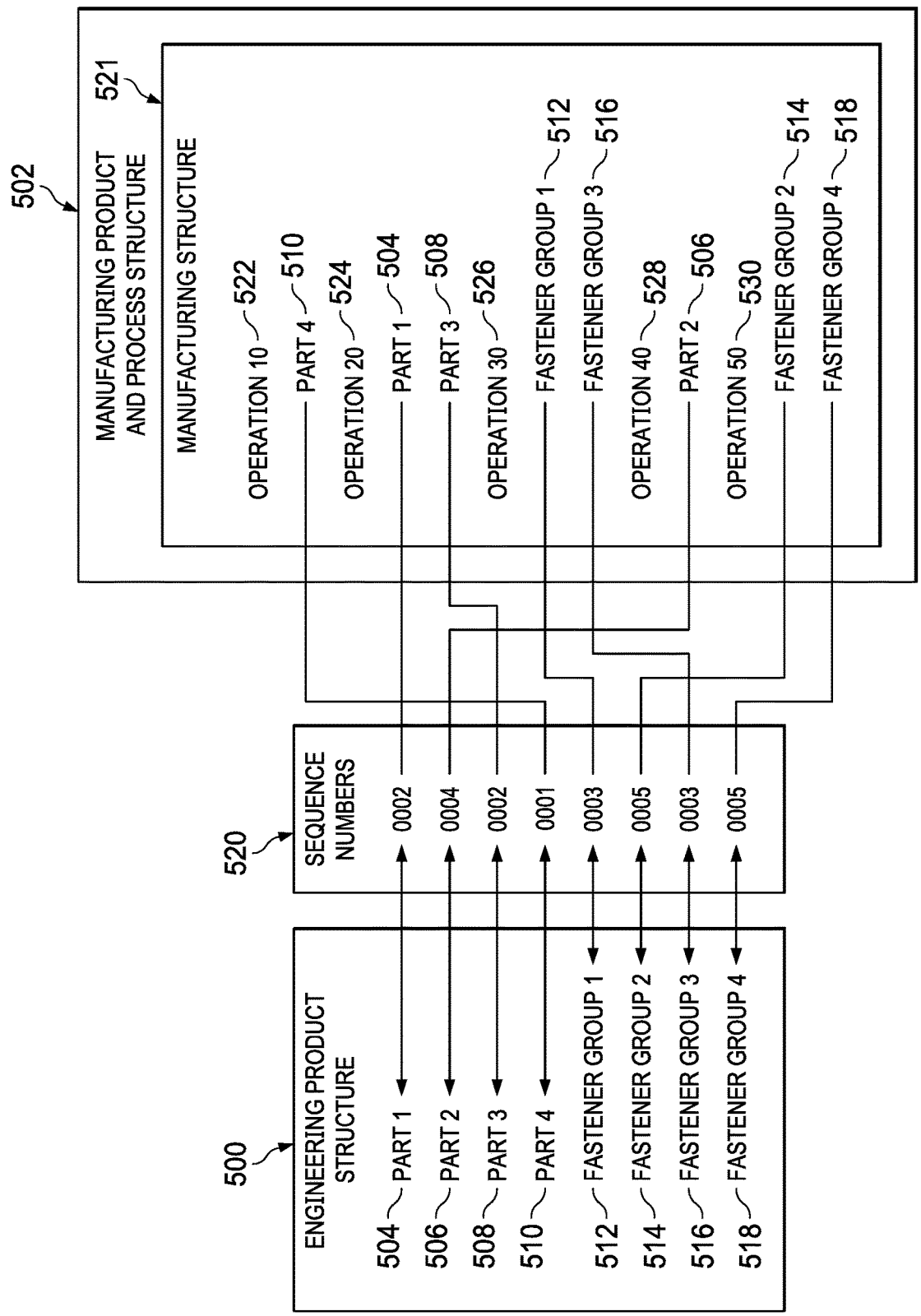
FIG. 5 is an illustration of an example process flow for creating a manufacturing product and process structure in accordance with an illustrative embodiment.

With reference now to FIG. 5, an illustration of an example process flow for creating a manufacturing product and process structure is depicted in accordance with an illustrative embodiment. In this illustrative example, engineering product structure 500 can be processed to form manufacturing product and process structure 502 which embodies a manufacturing process plan.

In this illustrative example, engineering product structure 500 comprises Part 1 504, Part 2 506, Part 3 508, Part 4 510, Fastener Group 1 512, Fastener Group 2 514, Fastener Group 3 516, and Fastener Group 4 518. In this illustrative example, each fastener group is considered a part in engineering product structure 500.

In this illustrative example, sequence numbers 520 are assigned to the parts in engineering product structure 500. As depicted, in sequence numbers 520, sequence number 0001 is assigned to Part 4 510, and sequence number 0002 is assigned to Part 1 504 and Part 3 508. Sequence number 0003 is assigned to Fastener Group 1 512 and Fastener Group 3 516 in sequence numbers 520. In this example, sequence number 0004 is assigned to Part 2 506, and sequence number 0005 is assigned to Fastener Group 2 514 and Fastener Group 4 518.

As depicted, manufacturing product and process structure 502 can be generated using engineering product structure 500 and sequence numbers 520 assigned to the parts in engineering product structure 500. In the illustrative example, manufacturing product and process structure 502 comprises manufacturing structure 521. As depicted, manufacturing structure 521 comprises operations and parts that form part of the manufacturing process plan.

In this illustrative example, manufacturing structure 521 includes operation 10 522, operation 20 524, operation 30 526, operation 40 528, and operation 50 530. Each of these operations are one or more steps that can be performed on parts in engineering product structure 500 to form an assembly or product. All of the parts assigned a sequence number are assigned to an operation that specifies how those parts with the same sequence number are connected to form an assembly or otherwise processed for later use.

In this illustrative example, operation 10 522 includes Part 4 510. Operation 20 524 includes Part 1 504 and Part 3 508. Operation 30 526 includes Fastener Group 1 512 and Fastener Group 3 516. Operation 40 528 includes Part 2 506. As depicted, operation 50 530 includes Fastener Group 2 514 and Fastener Group 4 518.

In this illustrative example, the assignment of sequence numbers 520 and the creation of manufacturing product and process structure 502 are performed automatically without needing user input. Refinements of manufacturing structure 512 can be performed by a human operator. Further, additional operations such as drilling, deburring, cleaning, ceiling application, and other suitable operations can be added to manufacturing product and process structure 502.

Figure 6:
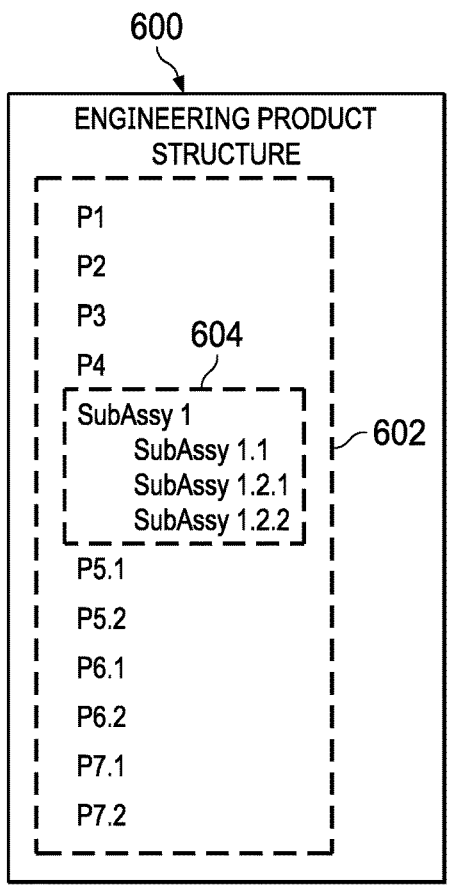
FIG. 6 is an illustration of an example engineering product structure in accordance with an illustrative embodiment.

With reference next to FIG. 6, an illustration of an example engineering product structure is depicted in accordance with an illustrative embodiment. Engineering product structure 600 is an example of one implementation for engineering product structure 228 in model 208 in FIG. 2.

In this illustrative example, engineering product structure 600 comprises parts 602 for a product. In this example, subassembly 604 is in engineering product structure 600. As depicted, engineering product structure 600 does not include identification of a build sequence connecting parts to each other to form the product.

Figure 7:
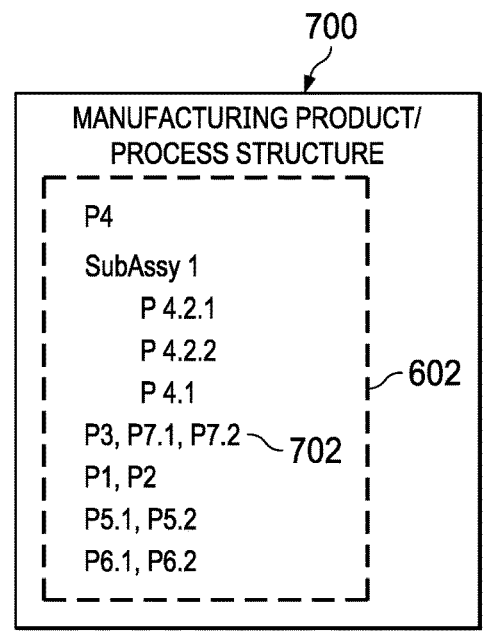
FIG. 7 is an illustration of an example manufacturing product and process structure in accordance with an illustrative embodiment.

Turning to FIG. 7, an illustration of an example manufacturing product and process structure is depicted in accordance with an illustrative embodiment. Manufacturing product and process structure 700 is an example of one implementation for manufacturing product and process structure 230 in assembly model 236 in FIG. 2.

In this illustrative example, manufacturing product and process structure 700 comprises parts 602. In contrast to the manner in which parts 602 are listed in engineering product structure 600 in FIG. 6, parts 602 in manufacturing product and process structure 700 are organized to identify a build sequence for parts 602.

For example, line 702 in manufacturing product and process structure 700 indicates a build sequence in which part P3 is connected to part P7.1 with part P7.2 then being connected to part P7.1.

Figure 8:
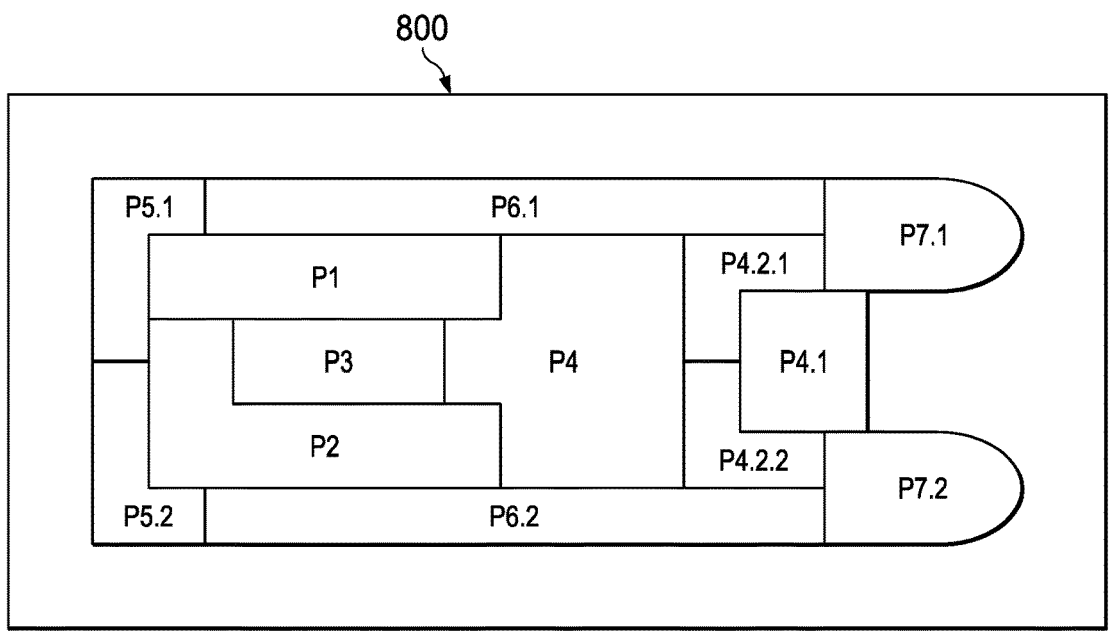
FIG. 8 is an illustration of an example display of an engineering product structure in accordance with an illustrative embodiment.

With reference next to FIG. 8, an illustration of an example display of an engineering product structure is depicted in accordance with an illustrative embodiment. Display 800 is an example of a display in graphical user interface 218 in human machine interface 226 in FIG. 2. As depicted, display 800 is a visual depiction of parts 602 from engineering product structure 600 in FIG. 6.

Figure 9:
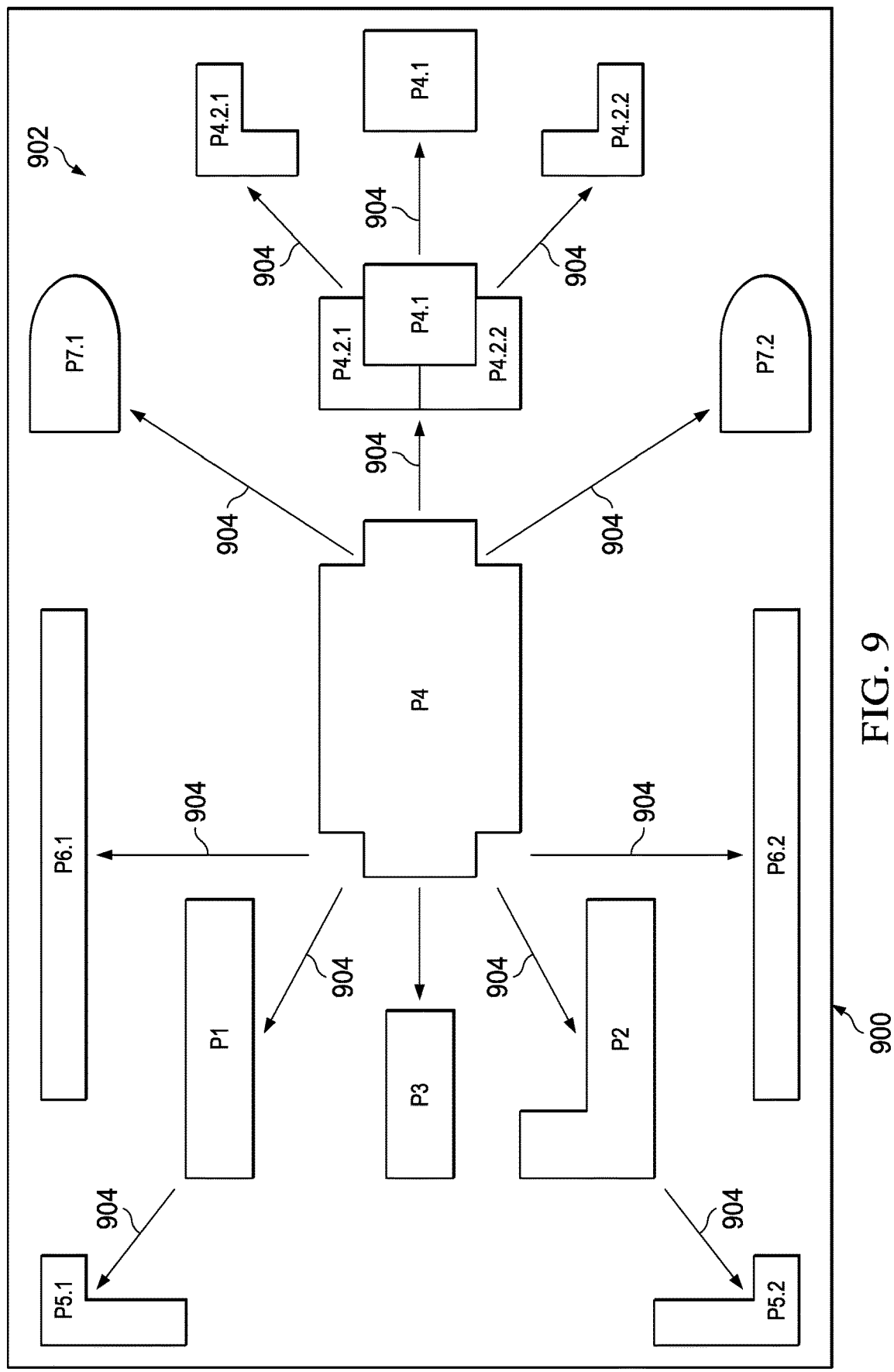
FIG. 9 is an illustration of an example display of an exploded view of a manufacturing product and process structure in accordance with an illustrative embodiment.

In FIG. 9, an illustration of an example display of an exploded view of a manufacturing product and process structure is depicted in accordance with an illustrative embodiment. Display 900 is an example of a display in graphical user interface 218 in human machine interface 226 in FIG. 2. As stated, display 900 includes exploded view 902 of parts 602 in manufacturing product and process structure 700 in FIG. 7.

As can be seen in exploded view 902, connectors 904 can be used to indicate connections between parts 602. Further, connectors 904 can be associated with sequence numbers (not shown) that identify a build sequence. For example, each connector can have a sequence number or identifier that is displayed in association with a connector in which the sequence number identifier indicates a sequence in which the parts are connected to other parts. The build sequence enables at least one of a human operator, automated equipment, a robotic arm, or some other suitable tool to identify the sequence in which parts 602 in manufacturing product and process structure 700 in FIG. 7 are to be connected to each other.

Figure 10:
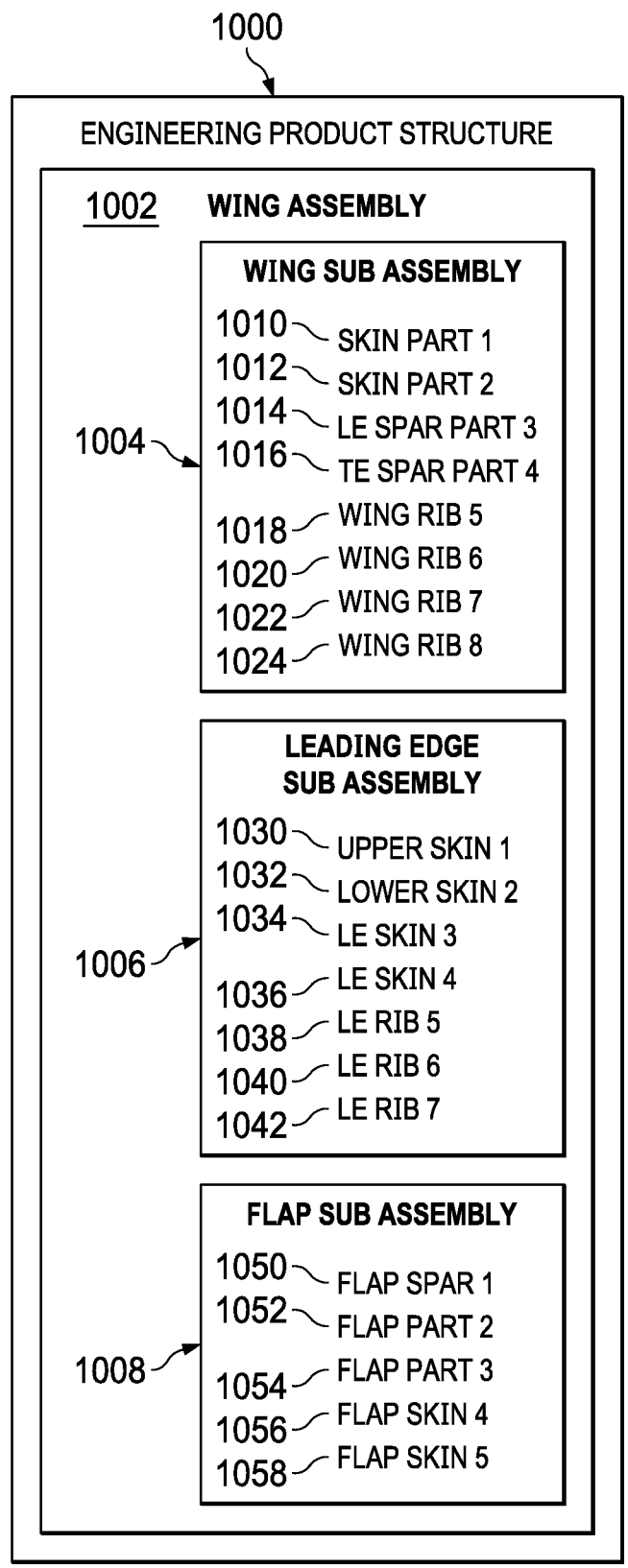
FIG. 10 is an illustration of an example engineering product structure in accordance with an illustrative embodiment.

With reference next to FIG. 10, an illustration of an example engineering product structure is depicted in accordance with an illustrative embodiment. In this illustrative example, engineering product structure 1000 is an example of one implementation for engineering product structure 228 in FIG. 2.

As depicted, engineering product structure 1000 is for wing assembly 1002. In this example, wing assembly 1002 includes wing subassembly 1004, leading-edge subassembly 1006, and flap subassembly 1008.

In this example, wing subassembly 1004 is comprised of skin part 1 1010, skin part 2 1012, LE spar part 3 1014, TE spar part 4 1016, wing rib 5 1018, wing rib 6 1020, wing rib 7 1022, and wing rib 8 1024. As depicted, leading-edge subassembly 1006 comprises upper skin 1 1030, lower skin 2 1032, LE skin 3 1034, LE skin 4 1036, LE rib 5 1038, LE rib 6 1040, and LE rib 7 1042. In this illustration, flap subassembly 1008 comprises flap spar 1 1050, flap part 2 1052, flap part 3 1054, flap skin 4 1056, and flap skin 5 1058.

Figure 11:
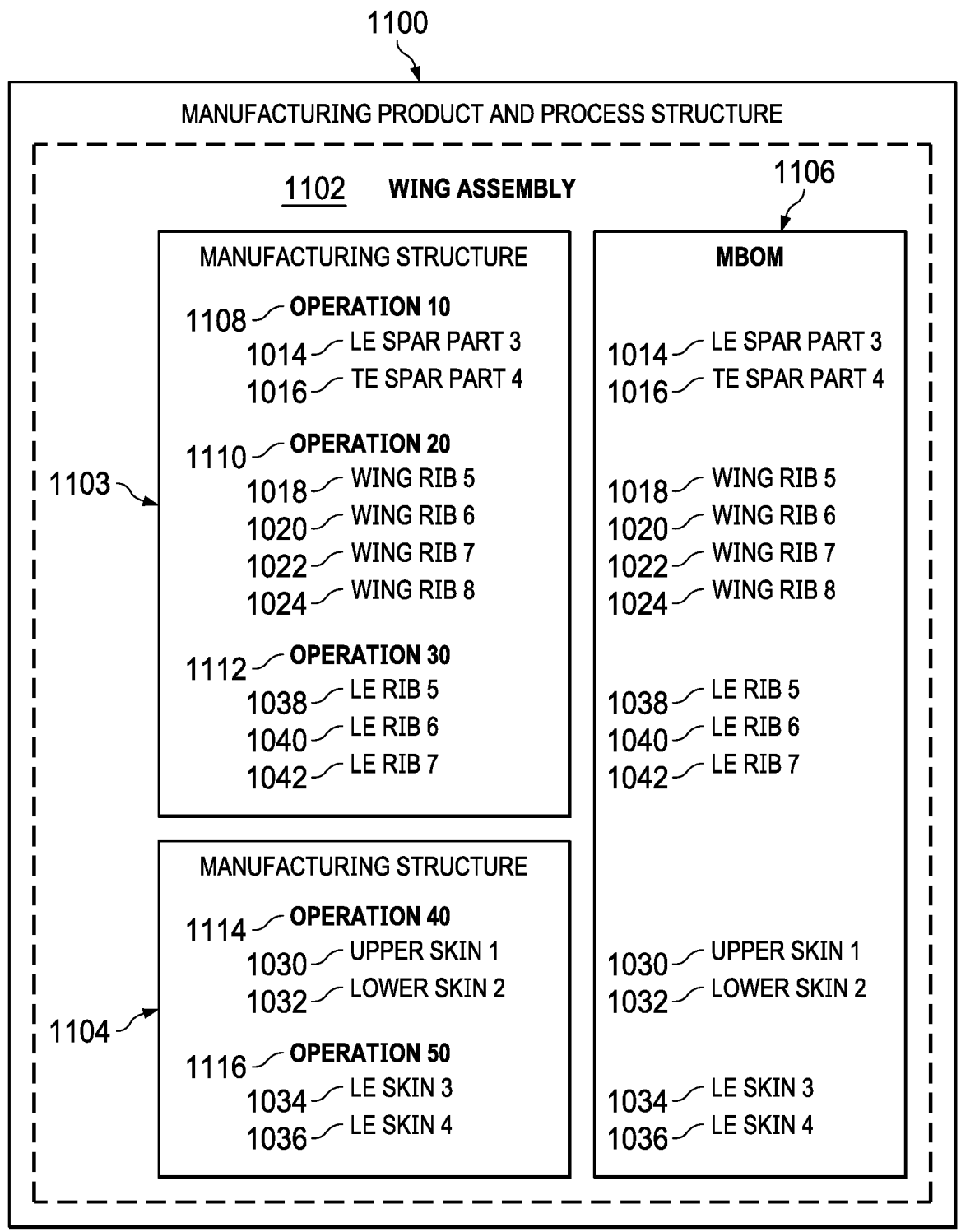
FIG. 11 is an illustration of an example manufacturing product and process structure in accordance with an illustrative embodiment.

Turning next to FIG. 11, an illustration of an example manufacturing product and process structure is depicted in accordance with an illustrative embodiment. In this illustrative example, manufacturing product and process structure 1100 is an example of one implementation for manufacturing product and process structure 230 shown in FIG. 2. In this example, manufacturing product and process structure 1100 is generated from engineering product structure 1000 in FIG. 10.

As depicted, manufacturing product and process structure 1100 is for wing assembly 1102. In this example, the parts are the same parts as in engineering product structure 1000 in FIG. 10. These parts, however, are rearranged into groupings based on processes for assembling the different parts to form wing assembly 1102.

As depicted, wing assembly 1102 comprises manufacturing structure 1103 and manufacturing structure 1104 which list parts used to assemble each manufacturing structure in wing assembly 1102. In this illustrative example, the parts in each of the manufacturing structures are identified based on sequence numbers, such as sequence numbers 410 in FIG. 4.

In this illustrative example, wing assembly 1102 has a sequence number. As depicted, fasteners and parts that can be visually exploded are assigned a sequence number. The sequence numbers are determined based on the order in which those parts can be installed in the proper sequence. As a result, in wing assembly 1102, LE spar part 3 1014 and TE spar part 4 1016 will have the same sequence numbers because these parts are located in operation 10 1108. As another example, operation 20 1110, wing rib 5 1018, wing rib 6 1020, wing rib 7 1022, and wing rib 8 1024 have the same sequence numbers that are unique from the sequence numbers assigned to LE spar part 3 1014 and TE spar part 4 1016.

This sequence number assignment can be made for each group of parts, and the sequence number is unique from the other groups listed in manufacturing bill of materials (MBOM) 1106. Additionally, manufacturing bill of materials (MBOM) 1106 identifies the parts needed to assemble wing assembly 1102.

In this illustrative example, wing assembly 1102 is created by performing operation 10 1108, operation 20 1110, and operation 30 1112.

Operation 10 1108 is performed using LE spar part 3 1014 and TE spar part 4 1016. Operation 20 1110 is performed using wing rib 5 1018, wing rib 6 1020, wing rib 7 1022, and wing rib 8 1024. Operation 30 1120 is performed using LE rib 5 1038, LE rib 6 1040, and LE rib 7 1042.

As depicted, manufacturing structure 1104 is created by performing operation 40 1114 and operation 50 1116. Operation 40 1114 is performed using upper skin 1 1030 and lower skin 2 1032. Operation 50 1116 is performed using LE skin 3 1034 and LE skin 4 1036.

Figure 12:
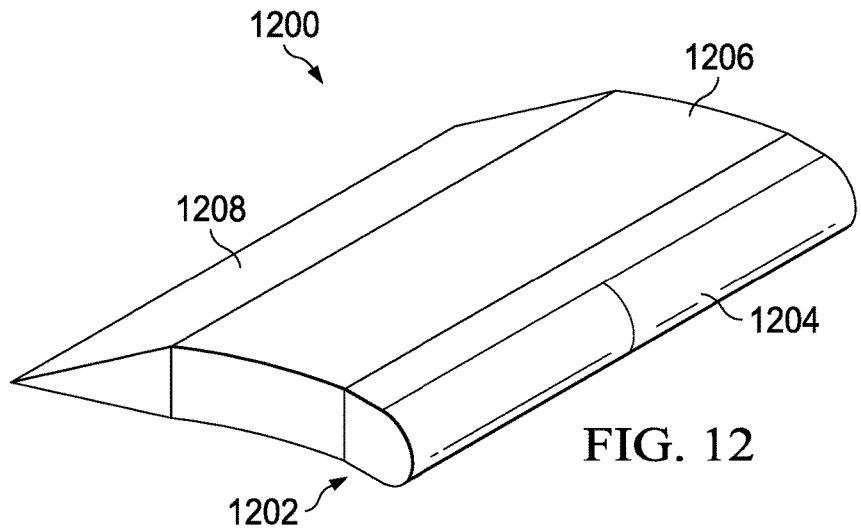
FIG. 12 is an illustration of an example display of an engineering product structure for a wing assembly in accordance with an illustrative embodiment.

In FIG. 12, an illustration of an example display of an engineering product structure for a wing assembly is depicted in accordance with an illustrative embodiment. Display 1200 is an example of a display in graphical user interface 218 in human machine interface 226 in FIG. 2. As depicted, display 1200 is a visual depiction of parts in engineering product structure 1000 in FIG. 10.

As can be seen in display 1200, wing assembly 1202 comprises leading-edge subassembly 1204, wing subassembly 1206, and flap subassembly 1208. In this example, leading-edge subassembly 1204 is a visualization of leading-edge subassembly 1006 in engineering product structure 1000 in FIG. 10; wing subassembly 1206 is a visualization of wing subassembly 1004 in engineering product structure 1000 in FIG. 10; and flap subassembly 1208 is a visualization of flap subassembly 1008 in engineering product structure 1000 in FIG. 10.

Figure 13:
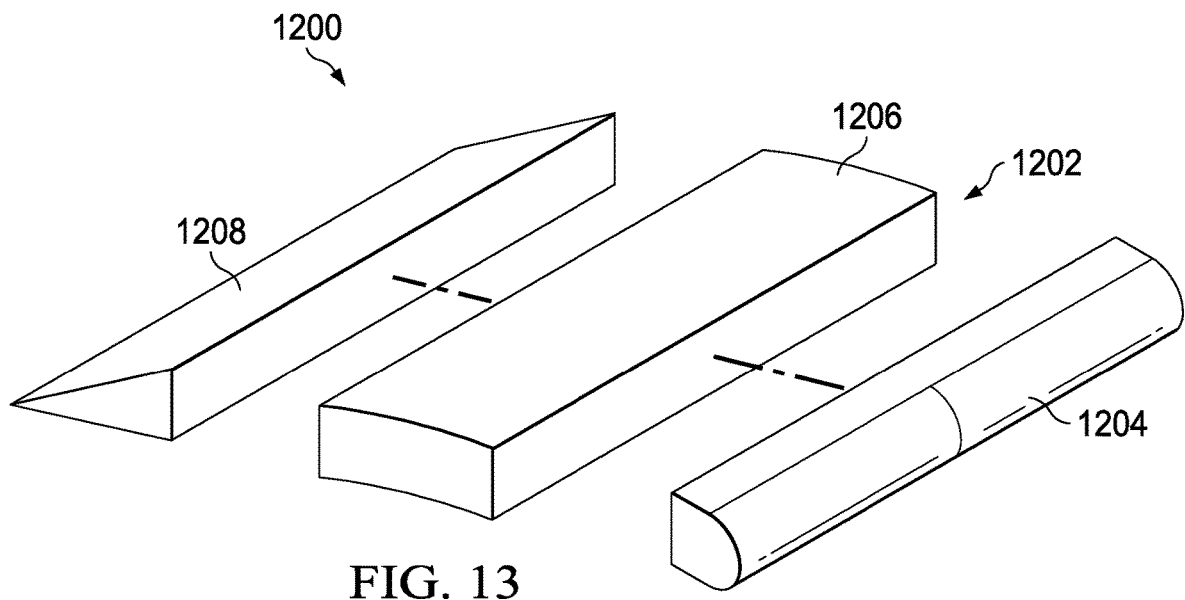
FIG. 13 is an illustration of an example display of partially exploded view of an engineering product structure for a wing assembly in accordance with an illustrative embodiment.

Turning next to FIG. 13, an illustration of an example display of a partially exploded view of an engineering product structure for a wing assembly is depicted in accordance with an illustrative embodiment. In this illustrative example, display 1200 shows a partially exploded view of wing assembly 1202 in FIG. 12.

Figure 14:
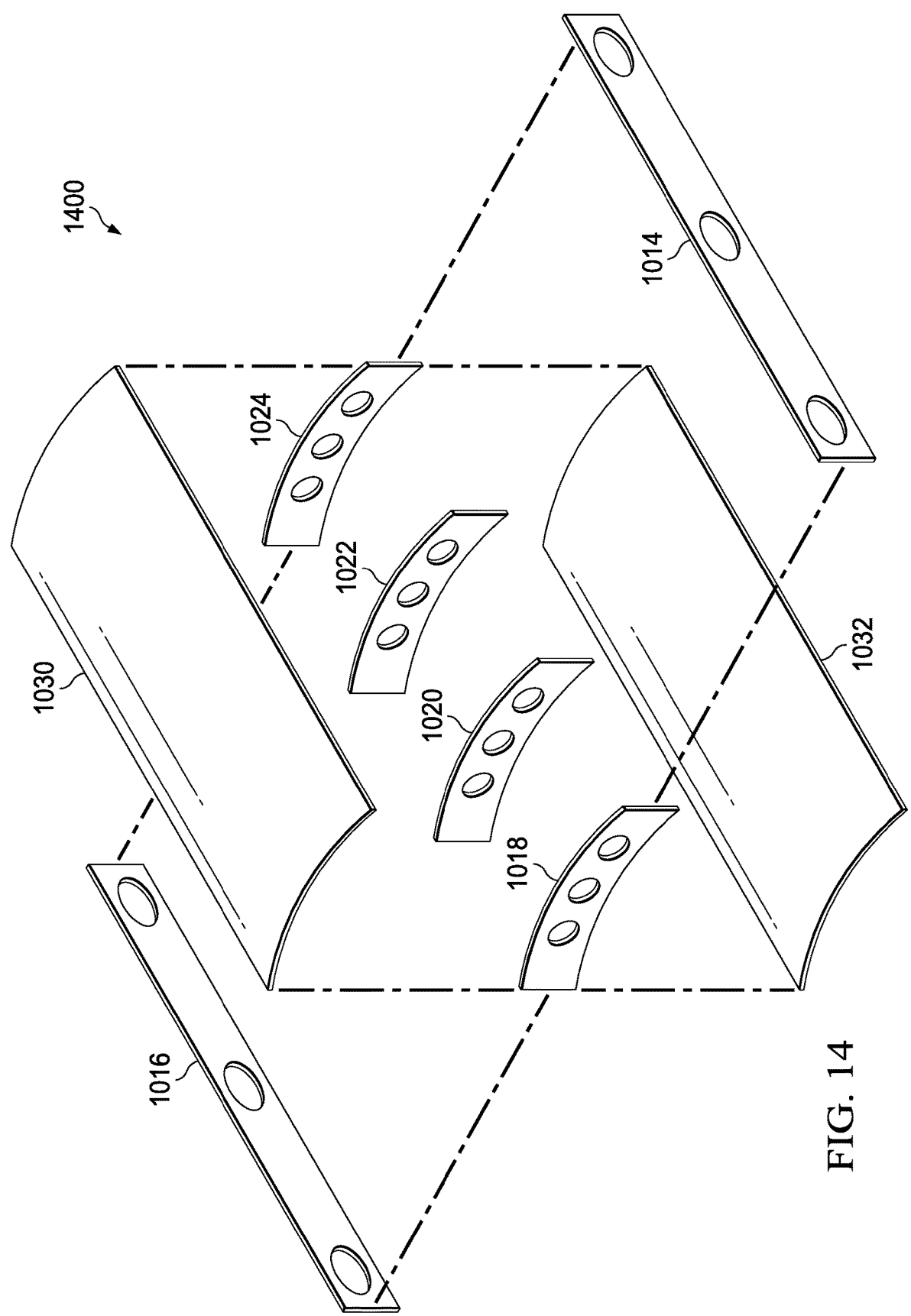
FIG. 14 is an illustration of an example wing subassembly in an engineering product structure in accordance with an illustrative embodiment.

With reference next to FIG. 14, an illustration of an example wing subassembly in an engineering product structure is depicted in accordance with an illustrative embodiment. Display 1400 is an example of a display in graphical user interface 218 in human machine interface 226 in FIG. 2.

As depicted, display 1400 is a visualization of parts in wing subassembly 1004 in engineering product structure 1000 in FIG. 10. In this illustrative example, reference numerals for the visualized parts in display 1400 are the reference numerals used for the listing of parts in engineering product structure 1000 in FIG. 10.

Figure 15:
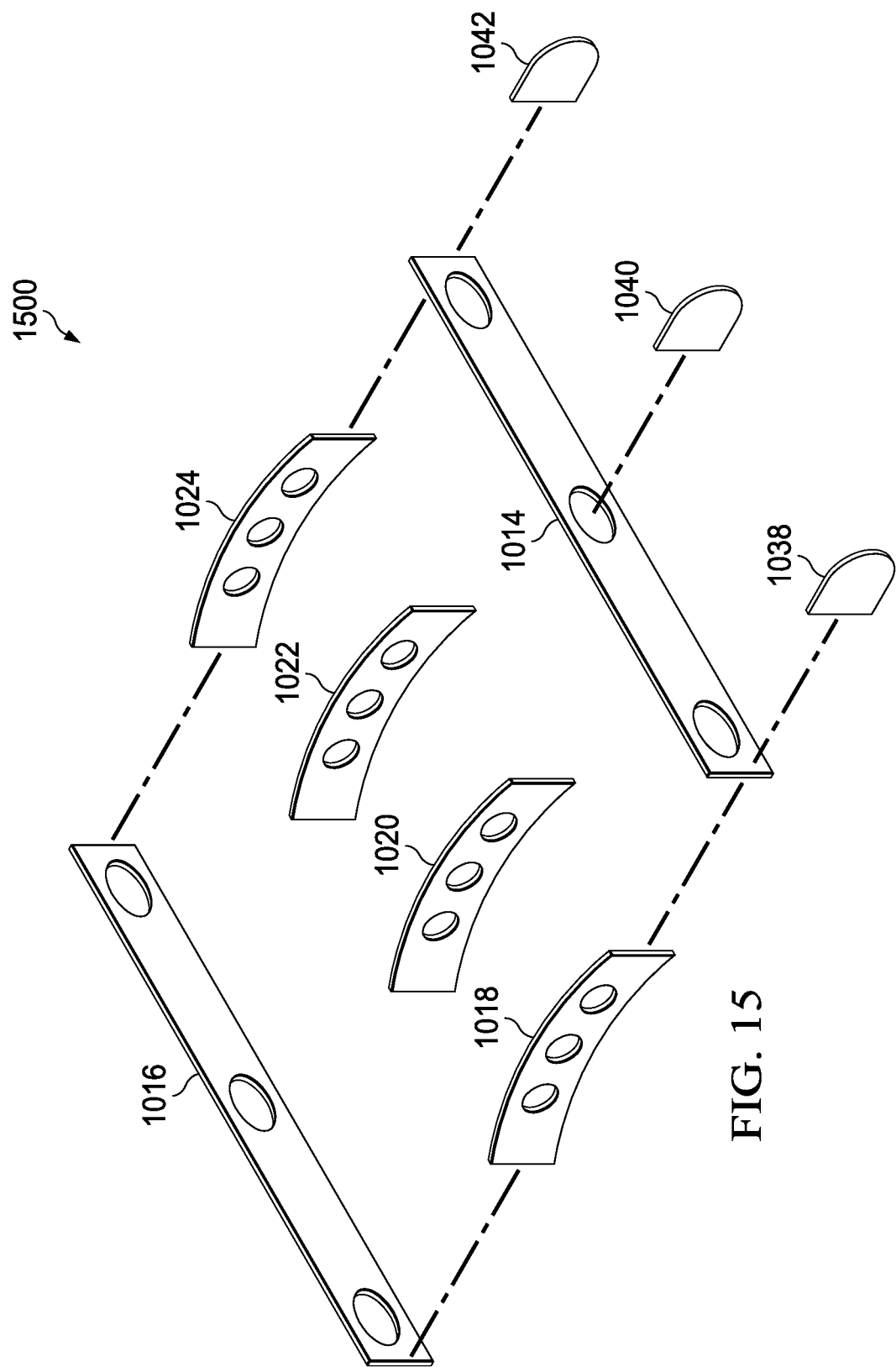
FIG. 15 is an illustration of an example wing subassembly in an engineering product structure in accordance with an illustrative embodiment.

With reference next to FIG. 15, an illustration of an example wing subassembly in an engineering product structure is depicted in accordance with an illustrative embodiment. Display 1500 is an example of a display in graphical user interface 218 in human machine interface 226 in FIG. 2. As depicted, display 1500 is a visualization of parts in manufacturing structure 1103 in FIG. 11. As depicted, reference numerals for the visualized parts in display 1500 are the same reference numerals used for the listing of parts in manufacturing product and process structure 1100 in FIG. 11.

As can be seen when comparing the exploded view in FIG. 14 with the exploded view of parts in FIG. 15, the parts in FIG. 14 are organized based on wing subassembly 1004 in FIG. 10. In contrast, the parts in FIG. 15 are organized based on how the parts are connected in different processes. In this example, the parts are for manufacturing structure 1103 in FIG. 11.

Figure 16:
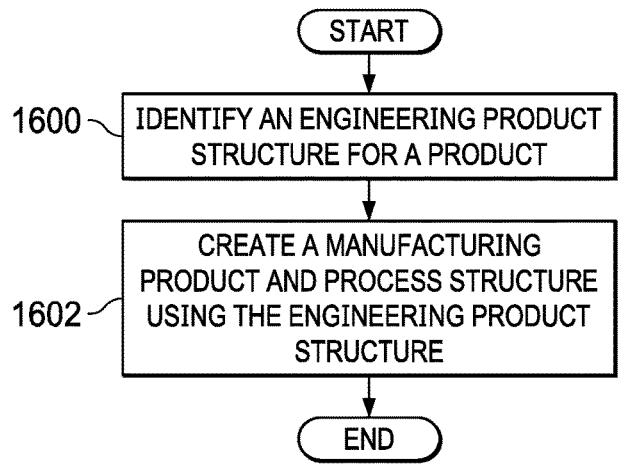
FIG. 16 is an illustration of an example flowchart of a process for managing a product in accordance with an illustrative embodiment.

Turning next to FIG. 16, an illustration of an example flowchart of a process for managing a product is depicted in accordance with an illustrative embodiment. The process in FIG. 16 can be implemented in hardware, software, or both. When implemented in software, the process can take the form of program code that is run by one or more processor units located in one or more hardware devices in one or more computer systems. For example, the process can be implemented in product manager 214 in computer system 212 in FIG. 2.

The process begins by identifying an engineering product structure for a product (operation 1600), wherein the engineering product structure comprises parts for the product. The process creates a manufacturing product and process structure using the engineering product structure (operation 1602). The process terminates thereafter. The manufacturing product and process structure comprises the parts and manufacturing information for connecting the parts to each other to form the product.

Figure 17:
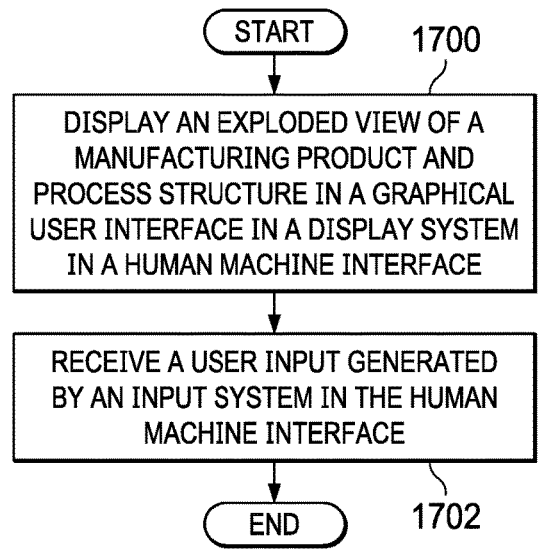
FIG. 17 is an illustration of an example flowchart of a process for modifying a manufacturing product and process structure in accordance with an illustrative embodiment.

With reference now to FIG. 17, an illustration of an example flowchart of a process for modifying a manufacturing product and process structure is depicted in accordance with an illustrative embodiment. The process in FIG. 17 can be implemented in hardware, software, or both. When implemented in software, the process can take the form of program code that is run by one or more processor units located in one or more hardware devices in one or more computer systems. For example, the process can be implemented in product manager 214 in computer system 212 in FIG. 2.

The process begins by displaying an exploded view of a manufacturing product and process structure in a graphical user interface in a display system in a human machine interface (operation 1700). The process receives a user input generated by an input system in the human machine interface (operation 1702). The process terminates thereafter. The user input in operation 1702 changes manufacturing information in the manufacturing product and process structure.

Figure 18:
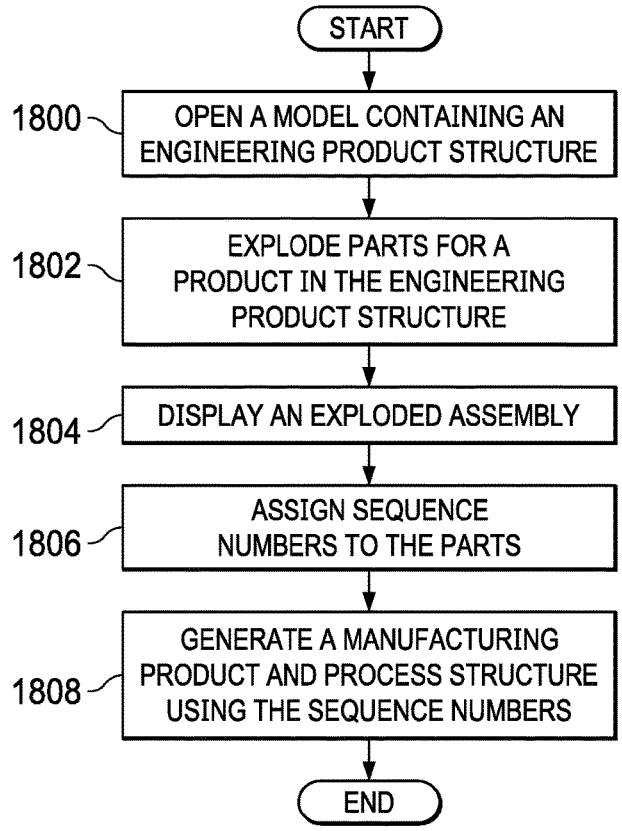
FIG. 18 is an illustration of an example flowchart of a process for grouping parts for a manufacturing product and process structure in accordance with an illustrative embodiment.

With reference now to FIG. 18, an illustration of an example flowchart of a process for grouping parts for a manufacturing product and process structure is depicted in accordance with an illustrative embodiment. The process in FIG. 18 can be implemented in hardware, software, or both. When implemented in software, the process can take the form of program code that is run by one or more processor units located in one or more hardware devices in one or more computer systems. For example, the process can be implemented in product manager 214 in computer system 212 in FIG. 2.

In the illustrative example, this process can be performed after an engineering product structure is opened in a CAD/3D application and the processing of the engineering product structure that is being exploded.

The process begins by opening a model comprising an engineering product structure (operation 1800). In this illustrative example, the model can be opened and displayed in a graphical user interface to provide visualization to a human operator.

The process explodes parts for a product in the engineering product structure (operation 1802). An explosion of an assembly can be performed such that the different parts, subassemblies, and fastener groups are clearly seen in an exploded state. The process displays an exploded assembly (operation 1804).

The process assigns sequence numbers to the parts (operation 1806). In operation 1806, a group of fasteners can be considered a part for purposes of assignment of sequence numbers. As another example, a subassembly in an assembly also can be considered a part. The assignment of the sequence numbers can be performed in a number of different ways. The sequence numbers can be assigned based on how parts are grouped for purposes of connecting the parts to form an assembly. For example, all of the parts that are connected to form the assembly can be considered part of an operation. In some illustrative examples, a series of operations can be performed to connect the parts to form the assembly. Each operation can be assigned a sequence number and the parts used in that operation have the same sequence number.

For example, sequence numbers can be based on an operation performed with a group of parts. In one illustrative example, part A and part B are connected to each other using a group of fasteners. Part A, part B, and the group of fasteners can all be assigned the same sequence number. The structure for part A or part B may or may not be an assembly or subassembly. The structure can be used in another operation which other parts are connected to the structure formed by part A and part B.

The process generates a manufacturing product and process structure using the sequence numbers (operation 1808). The manufacturing product and process structure can be organized by manufacturing structures. Each manufacturing structure can have one or more operations that are performed to connect the parts to form the manufacturing structure. Each of these operations can be assigned a sequence number. In this example, the operations include a listing of the parts. The parts having the same sequence number are assigned to an operation for the sequence number. This process can also include assigning selected parts such as fastener groups.

The process terminates thereafter. In this example, each operation comprises the parts with the same sequence numbers.

Figure 19:
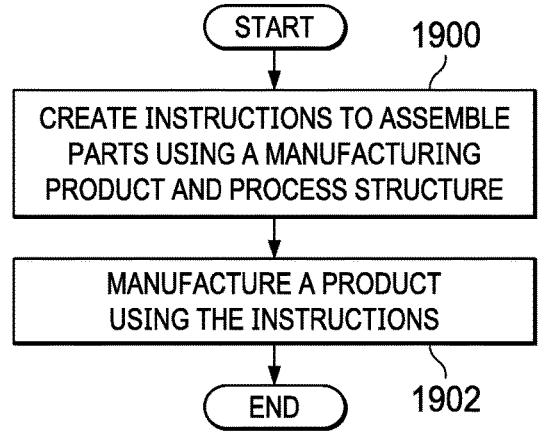
FIG. 19 is an illustration of an example flowchart of a process for manufacturing a product using a manufacturing product and process structure in accordance with an illustrative embodiment.

In FIG. 19, an illustration of an example flowchart of a process for manufacturing a product using a manufacturing product and process structure is depicted in accordance with an illustrative embodiment. The process in FIG. 19 can be implemented in hardware, software, or both. When implemented in software, the process can take the form of program code that is run by one or more processor units located in one or more hardware devices in one or more computer systems. For example, the process can be implemented in product manager 214 in computer system 212 in FIG. 2.

The process begins by creating instructions to assemble parts using a manufacturing product and process structure (operation 1900). The instructions created in operation 1900 can include, for example, a number of manufacturing assemblies and a number of processes for building a product. The number of manufacturing assemblies comprises a number of groupings of parts. The parts in a manufacturing structure are placed into a group for the manufacturing structure based on parts used by a process used to build the manufacturing structure. In other words, the instructions can include operations to be performed to build a manufacturing structure along with the parts that are needed for the manufacturing structure.

The instructions created in operation 1900 can take a number of different forms. For example, the instructions can be instructions in a form for use by a human operator. For example, the instructions can be a work order, an interactive display to provide a visualization of a build sequence, or some other suitable form for use by one or more human operators to assemble parts to form a product.

In another example, the instructions can be program code run by a computer system to control manufacturing equipment to assemble the parts to form the product. The process manufactures a product using the instructions (operation 1902). The process terminates thereafter.

Figure 20:
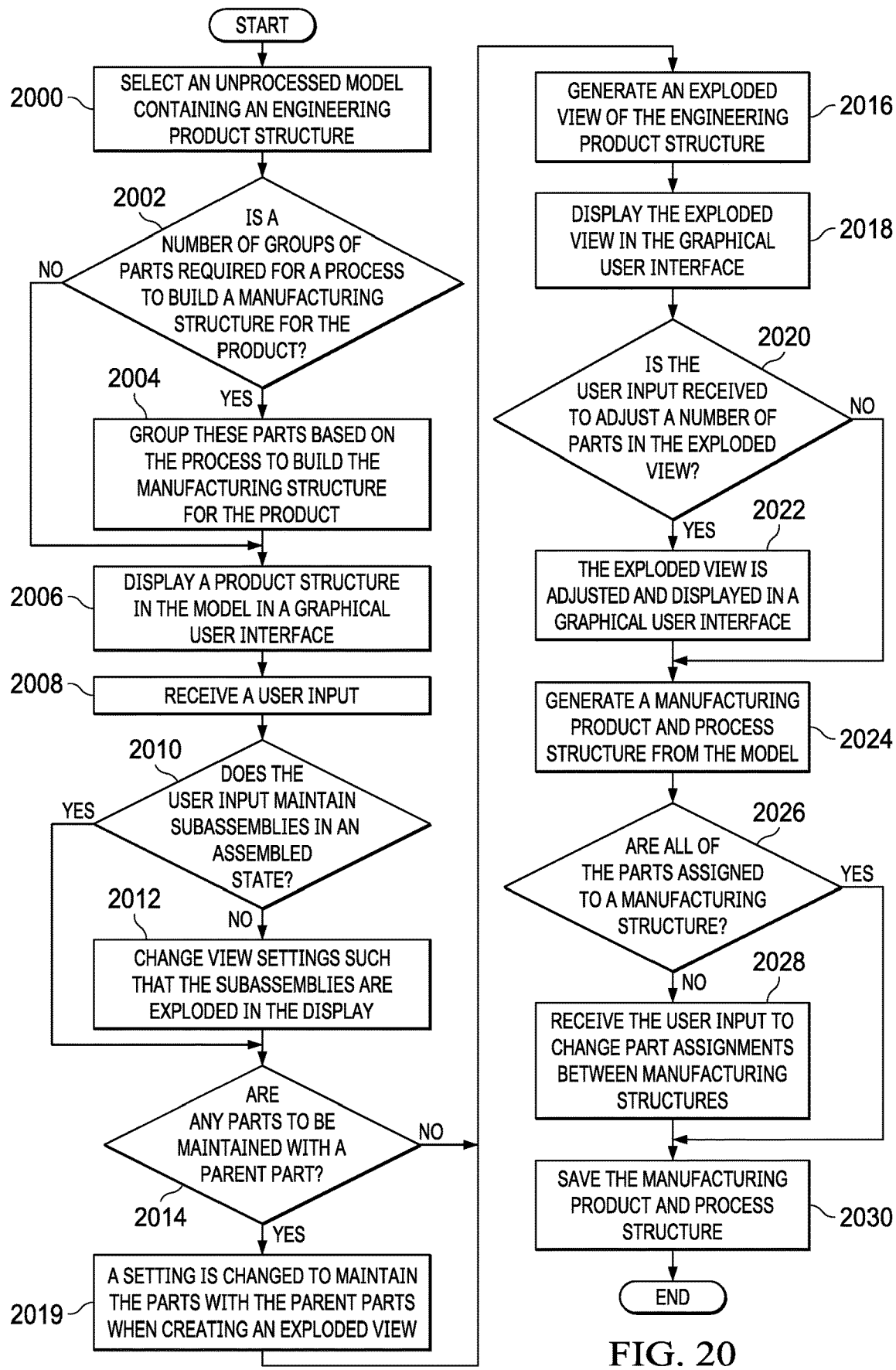
FIG. 20 is an illustration of an example flowchart of a process for automated creation of manufacturing product and process structures from engineering product structures in accordance with an illustrative embodiment.

With reference next to FIG. 20, an illustration of an example flowchart of a process for automated creation of manufacturing product and process structures from engineering product structures is depicted in accordance with an illustrative embodiment. The process in FIG. 20 can be implemented in hardware, software, or both. When implemented in software, the process can take the form of program code that is run by one or more processor units located in one or more hardware devices in one or more computer systems. For example, the process can be implemented in product manager 214 in computer system 212 in FIG. 2.

The process begins by selecting an unprocessed model comprising an engineering product structure (operation 2000). This model can be, for example, model 208 in models 204 stored in model database 206 in FIG. 2.

The process determines whether a number of groups of parts is required for a process to build a manufacturing structure for the product (operation 2002). If a number of groups of parts is needed to build the manufacturing structure for the product, the process groups these parts based on the process to build the manufacturing structure for the product (operation 2004). For example, after parts are grouped, other parts, such as fasteners, may be needed in the process to connect the parts to form the manufacturing structure. The process displays a product structure in the model in a graphical user interface (operation 2006). The process proceeds directly to operation 2006 from operation 2002 if a number of groups of parts is not required for process. The process groups the parts based on operations performed for the process to build the manufacturing structure.

The process receives a user input (operation 2008). A determination is made as to whether the user input maintains subassemblies in an assembled state (operation 2010). In operation 2010, an assembly can have subassemblies that are connected to each other to form the assembly. The subassemblies can be assembled prior to building the assembly. The subassemblies are considered parts that are assembled with other parts to form the assembly.

If the user input is received to not maintain the subassemblies in the assembled state, the process changes view settings such that the subassemblies are exploded in the display (operation 2012). In this illustrative example, the default is to not explode the subassemblies.

A determination is made as to whether any parts are to be maintained with a parent part (operation 2014). For example, fasteners can be considered a child of a part. The head of the fastener that rests on the parent part can be maintained or displayed on the parent part when the exploded view is generated.

If the parts are not to be maintained with a parent part, those parts are exploded away from the parent part when generating the exploded view, and the process generates an exploded view of the engineering product structure (operation 2016). The process displays the exploded view in the graphical user interface (operation 2018).

With reference again to operation 2014, if the parts are to be maintained with a parent part, a setting is changed to maintain the parts with the parent parts when creating an exploded view (operation 2019). The process then proceeds to operation 2016.

With reference again to operation 2010, if the subassemblies are to be maintained in the assembled state, the process also proceeds to operation 2014 without adjusting the setting. In this case, the setting indicates that the subassemblies are not exploded.

A determination is made as to whether the user input is received to adjust a number of parts in the exploded view (operation 2020). If the user input is received adjusting the position of one or more parts in the exploded view, the exploded view is adjusted and displayed in a graphical user interface (operation 2022).

The process then generates a manufacturing product and process structure from the model (operation 2024). In operation 2024, the process places the parts that are used in the same operation in the manufacturing product and process structure. The parts for operation can be identified based on sequence numbers assigned to the parts in the process in FIG. 18. All of the parts of the same sequence number are assigned to the same operation in the manufacturing product and process structure.

In this illustrative example, the process proceeds directly to operation 2024 from operation 2020 if user input is not perceived to just a number parts in the exploded view. A determination is made as to whether all of the parts are assigned to a manufacturing structure (operation 2026). If not all of the parts are assigned to a manufacturing structure, the process receives the user input to change part assignments between manufacturing structures (operation 2028). In operation 2028, the user input can change the assignment of parts based on selections made to the parts displayed in the exploded view of the engineering product structure in the model. As another example, the user input is received making changes to a bill of materials.

The process then saves the manufacturing product and process structure (operation 2030). The process terminates thereafter. The manufacturing product and process structure can be used to create instruction such as work orders for assembling parts. The manufacturing product and process structure can also be used for ordering parts. With reference again to operation 2026, if all of the parts have been assigned to a manufacturing structure, the process proceeds to operation 2030.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation can take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks can occur out of the order noted in the figures. For example, in some cases, two blocks shown in succession can be performed substantially concurrently, or the blocks can sometimes be performed in the reverse order, depending upon the functionality involved. Also, other blocks can be added in addition to the illustrated blocks in a flowchart or block diagram.

Figure 21:
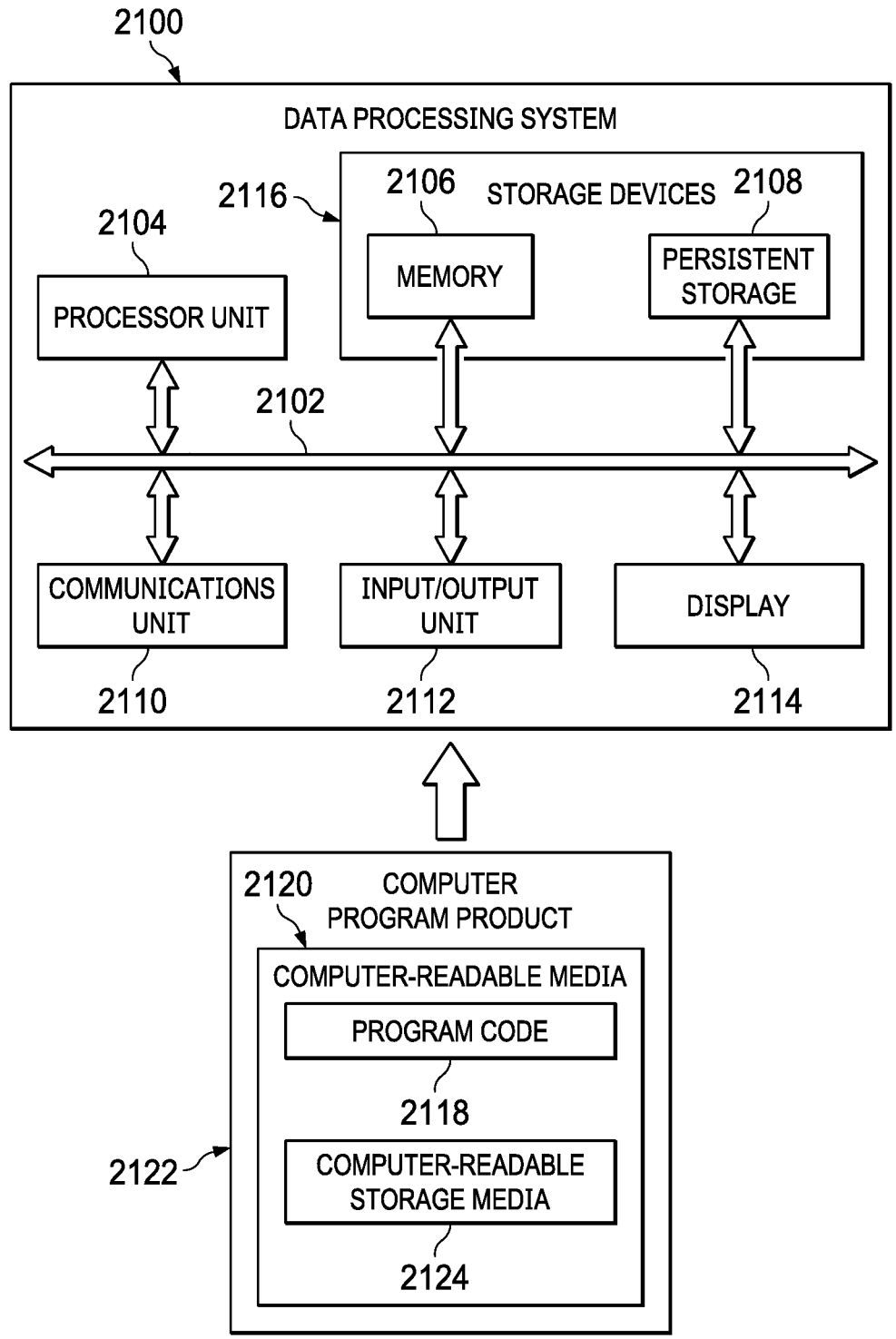
FIG. 21 is an illustration of an example block diagram of a data processing system in accordance with an illustrative embodiment.

Turning now to FIG. 21, an illustration of an example block diagram of a data processing system is depicted in accordance with an illustrative embodiment. Data processing system 2100 can be used to implement computer system 212 in FIG. 2. In this illustrative example, data processing system 2100 includes communications framework 2102, which provides communications between processor unit 2104, memory 2106, persistent storage 2108, communications unit 2110, input/output (I/O) unit 2112, and display 2114. In this example, communications framework 2102 takes the form of a bus system.

Processor unit 2104 serves to execute instructions for software that can be loaded into memory 2106. Processor unit 2104 includes one or more processors. For example, processor unit 2104 can be selected from at least one of a multicore processor, a central processing unit (CPU), a graphics processing unit (GPU), a physics processing unit (PPU), a digital signal processor (DSP), a network processor, or some other suitable type of processor.

Memory 2106 and persistent storage 2108 are examples of storage devices 2116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2116 can also be referred to as computer-readable storage devices in these illustrative examples. Memory 2106, in these examples, can be, for example, a random-access memory or any other suitable volatile or non-volatile storage device. Persistent storage 2108 can take various forms, depending on the particular implementation.

For example, persistent storage 2108 can comprise one or more components or devices. For example, persistent storage 2108 can be a hard drive, a solid-state drive (SSD), a flash memory, a rewritable optical disk, a rewritable magnetic tape, or some combination of the above. The media used by persistent storage 2108 also can be removable. For example, a removable hard drive can be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that can be connected to data processing system 2100. For example, input/output unit 2112 can provide a connection for user input through at least one of a keyboard, a mouse, or some other suitable input device. Further, input/output unit 2112 can send output to a printer. Display 2114 provides a mechanism to display information to a user.

Instructions for at least one of the operating system, applications, or programs can be located in storage devices 2116, which are in communication with processor unit 2104 through communications framework 2102. The processes of the different embodiments can be performed by processor unit 2104 using computer-implemented instructions, which can be located in a memory, such as memory 2106.

These instructions are referred to as program code, computer-usable program code, or computer-readable program code that can be read and executed by a processor in processor unit 2104. The program code in the different embodiments can be embodied on different physical or computer-readable storage medium, such as memory 2106 or persistent storage 2108.

Program code 2118 is located in a functional form on computer-readable media 2120 that is selectively removable and can be loaded onto or transferred to data processing system 2100 for execution by processor unit 2104. Program code 2118 and computer-readable media 2120 form computer program product 2122 in these illustrative examples. In the illustrative example, computer-readable media 2120 is computer-readable storage media 2124.

In these illustrative examples, computer-readable storage media 2124 is a physical or tangible storage device used to store program code 2118 rather than a medium that propagates or transmits program code 2118. Computer-readable storage media 2124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2118 can be transferred to data processing system 2100 using a computer-readable signal media. The computer-readable signal media can be, for example, a propagated data signal comprising program code 2118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 2100 are not meant to provide architectural limitations to the manner in which different embodiments can be implemented. In some illustrative examples, one or more of the components can be incorporated in or otherwise form a portion of, another component. For example, memory 2106, or portions thereof, can be incorporated in processor unit 2104 in some illustrative examples. The different illustrative embodiments can be implemented in a data processing system including components in addition to or in place of those illustrated for data processing system 2100. Other components shown in FIG. 21 can be varied from the illustrative examples shown. The different embodiments can be implemented using any hardware device or system capable of running program code 2118.

Figure 22:
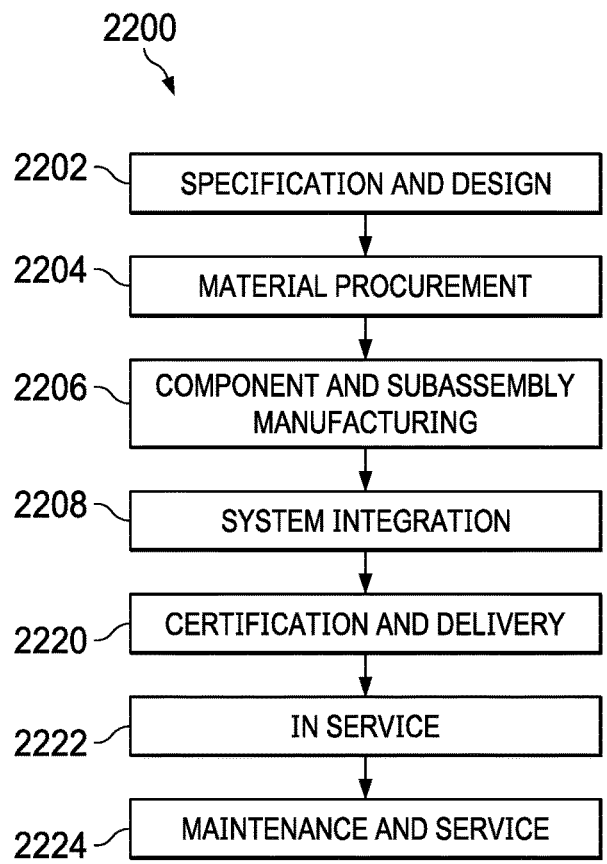
FIG. 22 is an illustration of an example aircraft manufacturing and service method in accordance with an illustrative embodiment.
Figure 23:
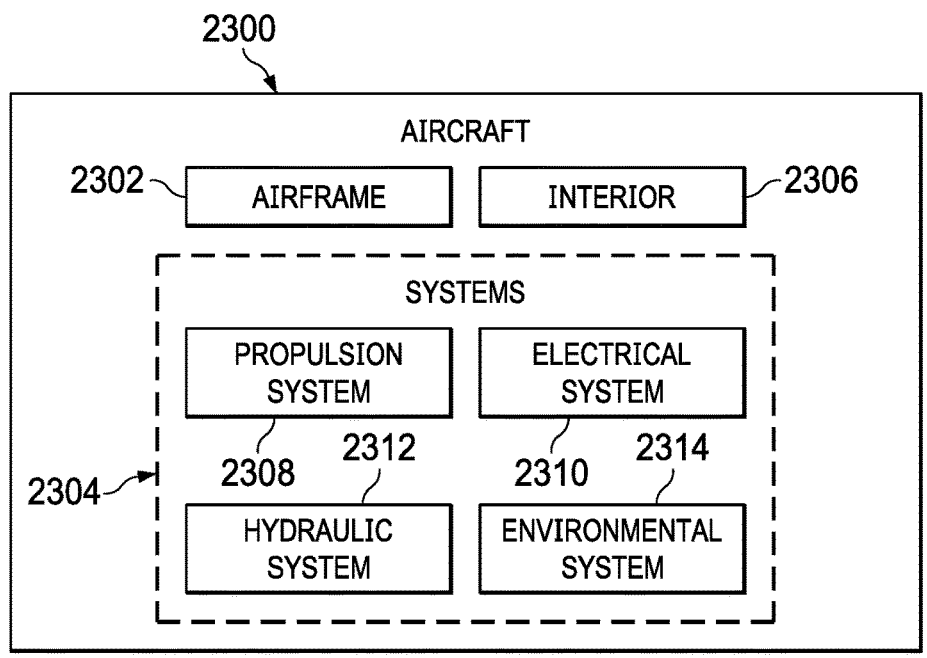
FIG. 23 is an illustration of an example block diagram of an aircraft in which an illustrative embodiment can be implemented.

Illustrative embodiments of the disclosure can be described in the context of aircraft manufacturing and service method 2200 as shown in FIG. 22 and aircraft 2300 as shown in FIG. 23. Turning first to FIG. 22, an illustration of an example aircraft manufacturing and service method is depicted in accordance with an illustrative embodiment. During pre-production, aircraft manufacturing and service method 2200 can include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 can go through certification and delivery 2210 in order to be placed in service 2212. While in service 2212 by a customer, aircraft 2300 in FIG. 23 is scheduled for routine maintenance and service 2214, which can include modification, reconfiguration, refurbishment, and other maintenance or service.

Each of the processes of aircraft manufacturing and service method 2200 can be performed or carried out by a system integrator, a third party, an operator, or some combination thereof. In these examples, the operator can be a customer. For the purposes of this description, a system integrator can include, without limitation, any number of aircraft manufacturers and major-system subcontractors; a third party can include, without limitation, any number of vendors, subcontractors, and suppliers; and an operator can be an airline, a leasing company, a military entity, a service organization, and so on.

With reference now to FIG. 23, an illustration of an example of a block diagram of an aircraft is depicted in which an illustrative embodiment can be implemented. In this example, aircraft 2300 is produced by aircraft manufacturing and service method 2200 in FIG. 22 and can include airframe 2302 with plurality of systems 2304 and interior 2306. Examples of systems 2304 include one or more of propulsion system 2308, electrical system 2310, hydraulic system 2312, and environmental system 2314. Any number of other systems can be included. Although an aerospace example is shown, different illustrative embodiments can be applied to other industries, such as the automotive industry.

Apparatuses and methods embodied herein can be employed during at least one of the stages of aircraft manufacturing and service method 2200 in FIG. 22. In one illustrative example, components or subassemblies produced in component and subassembly manufacturing 2206 in FIG. 22 can be fabricated or manufactured in a manner similar to components or subassemblies produced while aircraft 2300 is in service 2212 in FIG. 22. As yet another example, one or more apparatus embodiments, method embodiments, or a combination thereof can be utilized during production stages, such as component and subassembly manufacturing 2206 and system integration 2208 in FIG. 22. One or more apparatus embodiments, method embodiments, or a combination thereof can be utilized while aircraft 2300 is in service 2212, during maintenance and service 2214 in FIG. 22, or both.

The use of a number of the different illustrative embodiments can substantially expedite the assembly of aircraft 2300, reduce the cost of aircraft 2300, or both expedite the assembly of aircraft 2300 and reduce the cost of aircraft 2300. For example, product manager 138 in FIG. 1 can operate to reduce the use of resources such as time and labor currently expended to create instructions from engineering product structure is a model such as computer-aided models.

Figure 24:
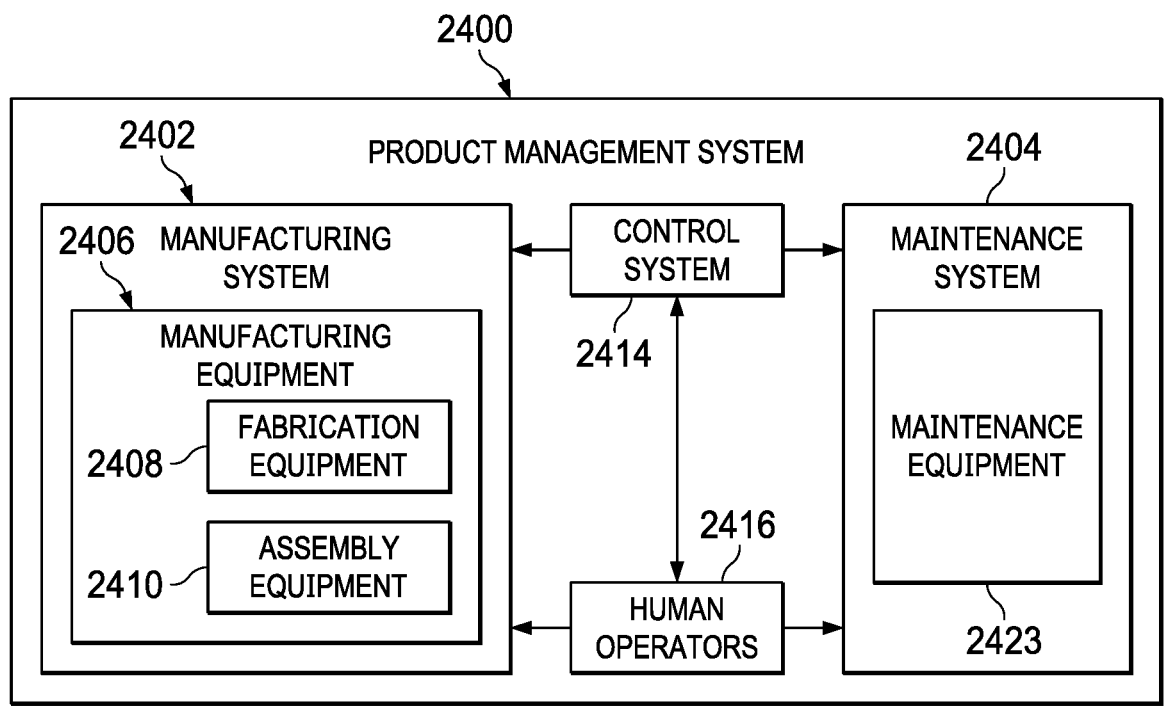
FIG. 24 is an illustration of an example block diagram of a product management system in accordance with an illustrative embodiment.

Turning now to FIG. 24, an illustration of an example block diagram of a product management system is depicted in accordance with an illustrative embodiment. Product management system 2400 is a physical hardware system. In this illustrative example, product management system 2400 includes at least one of manufacturing system 2402 or maintenance system 2404.

Manufacturing system 2402 is configured to manufacture products, such as aircraft 2300 in FIG. 23. As depicted, manufacturing system 2402 includes manufacturing equipment 2406. Manufacturing equipment 2406 includes at least one of fabrication equipment 2408 or assembly equipment 2410.

Fabrication equipment 2408 is equipment that used to fabricate components for parts used to form aircraft 2300 in FIG. 23. For example, fabrication equipment 2408 can include machines and tools. These machines and tools can be at least one of a drill, a hydraulic press, a furnace, a mold, a composite tape laying machine, a vacuum system, a lathe, or other suitable types of equipment. Fabrication equipment 2408 can be used to fabricate at least one of metal parts, composite parts, semiconductors, circuits, fasteners, ribs, skin panels, spars, antennas, or other suitable types of parts.

Assembly equipment 2410 is equipment used to assemble parts to form aircraft 2300 in FIG. 23. In particular, assembly equipment 2410 is used to assemble components and parts to form aircraft 2300 in FIG. 23. Assembly equipment 2410 also can include machines and tools. These machines and tools can be at least one of a robotic arm, a crawler, a fastener installation system, a rail-based drilling system, or a robot. Assembly equipment 2410 can be used to assemble parts such as seats, horizontal stabilizers, wings, engines, engine housings, landing gear systems, and other parts for aircraft 2300 in FIG. 23.

In this illustrative example, maintenance system 2404 includes maintenance equipment 2412. Maintenance equipment 2412 can include any equipment needed to perform maintenance on aircraft 2300 in FIG. 23. Maintenance equipment 2412 can include tools for performing different operations on parts on aircraft 2300 in FIG. 23. These operations can include at least one of disassembling parts, refurbishing parts, inspecting parts, reworking parts, manufacturing replacement parts, or other operations for performing maintenance on aircraft 2300 in FIG. 23. These operations can be for routine maintenance, inspections, upgrades, refurbishment, or other types of maintenance operations.

In the illustrative example, maintenance equipment 2412 can include ultrasonic inspection devices, x-ray imaging systems, vision systems, drills, crawlers, and other suitable devices. In some cases, maintenance equipment 2412 can include fabrication equipment 2408, assembly equipment 2410, or both to produce and assemble parts that needed for maintenance.

Product management system 2400 also includes control system 2414. Control system 2414 is a hardware system and can also include software or other types of components. Control system 2414 is configured to control the operation of at least one of manufacturing system 2402 or maintenance system 2404. In particular, control system 2414 can control the operation of at least one of fabrication equipment 2408, assembly equipment 2410, or maintenance equipment 2412.

The hardware in control system 2414 can be implemented using hardware that can include computers, circuits, networks, and other types of equipment. The control can take the form of direct control of manufacturing equipment 2406. For example, robots, computer-controlled machines, and other equipment can be controlled by control system 2414. In other illustrative examples, control system 2414 can manage operations performed by human operators 2416 in manufacturing or performing maintenance on aircraft 2300. For example, control system 2414 can assign tasks, provide instructions, display models, or perform other operations to manage operations performed by human operators 2416. In these illustrative examples, product manager 214 in FIG. 2 can be implemented in control system 2414 to manage at least one of the manufacturing or maintenance of aircraft 2300 in FIG. 23. For example, product manager 214 can create a manufacturing product and process structure from an engineering product structure. The manufacturing product and process structure can be used to generate instructions for manufacturing a product such as aircraft 2300 or a system of structure in aircraft 2300.

Instructions generated can be used to issue work orders to human operators 2416. As another example, the instructions can be program instructions that are used by a control system to control the operation of manufacturing equipment 2406, such as assembly equipment 2410.

In the different illustrative examples, human operators 2416 can operate or interact with at least one of manufacturing equipment 2406, maintenance equipment 2412, or control system 2414. This interaction can occur to manufacture aircraft 2300 in FIG. 23.

Of course, product management system 2400 can be configured to manage other products other than aircraft 2300 in FIG. 23. Although product management system 2400 has been described with respect to manufacturing in the aerospace industry, product management system 2400 can be configured to manage products for other industries. For example, product management system 2400 can be configured to manufacture products for the automotive industry as well as any other suitable industries.

The illustrative examples provide a number of different features and improvements. An illustrative system and method can utilize three-dimensional design assembly model data in conjunction with a user interactive selection method that leverages an exploded view of the engineering product data. The exploded views are generated via collision detection, interference analysis and dynamic exploded assembly algorithms automatically and through user interaction to define and determine an assembly sequence of order and derive a process structure manufacturing bill of materials (MBOM).

In one illustrative example, the assembly or a complex structure of a product are displayed such that the user can re-assign parts in a manufacturing process structure. These views in which parts are exploded away from one another reveal an assembly or installation paths in a way that clearly defines the interdependencies of the parts. Exploded views that are created can properly only expose internal parts. These exploded views can also convey a global assembly structure of a depicted object and local spatial relationships between the parts. The illustrative example takes advantage of this technology by allowing the user to modify and re-plan the engineering product and process structure into a manufacturing product and process structure.

The illustrative embodiments recognize and take into account that complex products comprise tens of thousands of parts with thousands of assemblies structured under an end item parent product and are typically configured based on design engineering requirements. This application and process in the illustrative examples can explode the engineering product structure based on a disassembly sequence into a manufacturing product structure and automatically assign parts to processes.

One technical issue solved by the illustrative example is the analysis, manipulation and planning of an engineering product structure, engineering requirements, and product data information into a properly structured manufacturing product and process structure in a timely fashion to meet design and manufacturing and program production schedules. Complex products comprise tens of thousands of parts with thousands of assemblies structured under an end item parent product and are typically configured based on design engineering requirements. This application and process in the illustrative example can explode the engineering product structure based on a disassembly sequence into a manufacturing product structure and to automatically assign parts to processes.

The illustrative example provides a technical solution including an interactive interface that allows the user to select three-dimensional models from an exploded view and dynamically create a manufacturing product and process structure from engineering model-based design. The illustrative example can automatically reconcile data and provide a visual report. The illustrative example can also allow for both mouse and touch gestures.

Some features of the illustrative examples are described in the following clauses. These clauses are examples of features not intended to limit other illustrative examples.

Clause 1:
A product manufacturing system comprising:
a computer system; and
a product manager in the computer system, wherein the product manager is configured to:
identify an engineering product structure for a product, wherein the engineering product structure comprises parts for the product; and
create a manufacturing product and process structure using the engineering product structure, wherein the manufacturing product and process structure comprises the parts and manufacturing information for connecting the parts to each other to form the product, wherein the manufacturing product and process structure is employable to facilitate assembly of the product.

Clause 2:
The product manufacturing system of Clause 1, wherein in creating a manufacturing product and process structure using the engineering product structure, wherein the manufacturing product and process structure comprises the parts and manufacturing information for connecting the parts to each other to form the product, the product manager is configured to:
identify a number of processes used to connect the parts to form the product; and
create a number of groupings of parts based on a number of processes used to build the product, wherein the manufacturing product and process structure comprises the number of processes used to form the product and the number of groupings of parts.

Clause 3:
The product manufacturing system of Clause 2, wherein the number of groupings of parts forms a number of manufacturing assemblies.

Clause 4:
The product manufacturing system as in any one of Clauses 1-3, wherein the manufacturing product and process structure includes a build sequence for assembling the parts.

Clause 5:
The product manufacturing system as in any one of clauses of Clauses 1-4 further comprising:
manufacturing equipment; and
a control system that is configured to control operation of the manufacturing equipment to manufacture the product using the manufacturing product and process structure.

Clause 6:
The product manufacturing system as in any one of Clauses 1-5, wherein the product manager is configured to create instructions to assemble the parts using the manufacturing product and process structure; and
wherein in controlling operation of manufacturing equipment to manufacture the product using the manufacturing product and process structure, a control system is configured to control manufacturing the product using the instructions.

Clause 7:
The product manufacturing system of Clause 6, wherein the instructions are in a form for use by a human operator.

Clause 8:
The product manufacturing system of Clause 6, wherein the instructions are program code run by the control system to control the manufacturing equipment to assemble the parts to form the product.

Clause 9:
The product manufacturing system as in any one of Clauses 1-8 further comprising:
a human machine interface comprising a display system and an input system;
wherein the product manager is configured to:
display an exploded view of the manufacturing product and process structure in a graphical user interface in the display system in the human machine interface; and
receive a user input generated by the input system in the human machine interface, where the user input changes the manufacturing information in the manufacturing product and process structure.

Clause 10:
A method for managing a product, the method comprising:
identifying, by a computer system, an engineering product structure for the product, wherein the engineering product structure comprises parts for the product; and
creating, by the computer system, a manufacturing product and process structure using the engineering product structure, wherein the manufacturing product and process structure comprises the parts and manufacturing information for connecting the parts to each other to form the product.

Clause 11:
The method of Clause 10 further comprising:
manufacturing the product using the manufacturing product and process structure.

Clause 12:
The method as in any one of Clause 10 or 11, wherein creating the manufacturing product and process structure using the engineering product structure, wherein the manufacturing product and process structure comprises the parts and manufacturing information for connecting the parts to each other to form the product comprises:
identifying a number of processes used to connect the parts to form the product; and
creating a number of groupings of parts based on the number of processes used to build the product, wherein the manufacturing product and process structure comprises the number of processes and the number of groupings of parts.

Clause 13:

The method of Clause 12, wherein the number of groupings of parts forms a number of manufacturing assemblies.

Clause 14:

The method of Clause 11, wherein manufacturing the product using the manufacturing product and process structure comprises:
creating instructions to assemble the parts using the manufacturing product and process structure; and
manufacturing the product using the instructions.

Clause 15:

The method of Clause 14, wherein the instructions are in a form for use by a human operator.

Clause 16:

The method of Clause 14, wherein the instructions are program code run by a computer system to control manufacturing equipment to assemble the parts to form the product.

Clause 17:

The method as in any one of Clauses 10-17 further comprising:
displaying an exploded view of the manufacturing product and process structure in a graphical user interface in a display system in a human machine interface; and
receiving a user input generated by an input system in the human machine interface, where the user input changes manufacturing information in the manufacturing product and process structure.

Clause 18:

A computer program product for managing a product, the computer program product comprising:
a computer-readable storage media;
first program code, stored on the computer-readable storage media, executable by a computer system to cause the computer system to identify an engineering product structure for the product, wherein the engineering product structure comprises parts for the product; and
second program code, stored on the computer-readable storage media, executable by the computer system to cause the computer system to create a manufacturing product and process structure using the engineering product structure, wherein the manufacturing product and process structure comprises the parts and manufacturing information for connecting the parts to each other to form the product.

Clause 19:

The computer program product of Clause 18, wherein the second program code comprises:
program code, stored on the computer-readable storage media, executable by the computer system to cause the computer system to identify a number of processes used to connect the parts to form the product; and
program code, stored on the computer-readable storage media, executable by the computer system to cause the computer system to create a number of groupings of parts based on the number of processes used to build the product, wherein the manufacturing product and process structure comprises the number of processes and the number of groupings of parts.

Clause 20:

The computer program product of Clause 19, wherein the number of groupings of parts forms a number of manufacturing assemblies.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A product manufacturing system that comprises:
a computer system; and
a product manager in the computer system, wherein the product manager is configured to:
identify an engineering product structure for a product, wherein the engineering product structure comprises parts for the product listed in an order;
form, based upon a fastener data scheme and a manufacturing requirement, a fastener-based group that comprises selected fasteners and associated parts from among the parts as listed in the engineering product structure;
perform a part explosion trajectory for the parts for the product that indicates the fastener-based group;
revise the order of the parts as listed in the engineering product structure based upon a sequence number assigned, respectively, to each of the parts in the fastener-based group to form a build sequence within a manufacturing structure; and
create, based upon the engineering product structure, a clearance path, a collision path, and the build sequence within the manufacturing structure, a manufacturing product and process structure for the parts in the product, wherein the manufacturing product and process structure comprises: the parts, and manufacturing information to connect the parts to each other to form the product.

2. The product manufacturing system of claim 1, wherein the product manager is configured to:
identify a number of processes used to connect the parts to form the product; and
create the sequence number unique from any group listed in a manufacturing bill of materials associated with the manufacturing structure.

3. The product manufacturing system of claim 2, wherein the number of groupings of parts forms a number of manufacturing assemblies.

4. The product manufacturing system of claim 1, wherein the manufacturing product and process structure comprises the build sequence.

5. The product manufacturing system of claim 1 further comprising:
manufacturing equipment; and
a control system that is configured to control operation of the manufacturing equipment to manufacture the product based upon the manufacturing product and process structure.

6. The product manufacturing system of claim 5, wherein instructions in program code run by the control system are configured to control the manufacturing equipment to assemble the parts to form the product.

7. The product manufacturing system of claim 1, wherein the product manager is configured to create instructions to assemble the parts using the manufacturing product and process structure; and
wherein a control system is configured to control manufacturing the product based upon the instructions.

8. The product manufacturing system of claim 7, wherein the instructions are in a form configured to receive an input from an operator.

9. The product manufacturing system of claim 1 further comprising:
a human machine interface that comprises: a display system, and an input system, wherein the product manager is configured to:
generate, derived from the collision path, and display an exploded view of the manufacturing product and process structure in a graphical user interface in the display system in the human machine interface; and
receive a change to the manufacturing information in the manufacturing product and process structure.

10. A method for managing a product, the method comprising a computer system specially programmed for:
identifying an engineering product structure for the product, wherein the engineering product structure comprises parts for the product listed in an order;
forming, using a fastener data scheme and a manufacturing requirement, a fastener-based group comprising selected fasteners and associated parts from among the parts as listed in the engineering product structure;
performing a part explosion trajectory for the parts for the product indicating the fastener-based group;
forming a build sequence within a manufacturing structure via revising the order of the parts as listed in the engineering product structure based upon a sequence number assigned, respectively, to each of the parts in the fastener-based group; and
creating, using the engineering product structure, a clearance path, a collision path, and the build sequence within the manufacturing structure, a manufacturing product and process structure, wherein the manufacturing product and process structure comprises: the parts, and manufacturing information for connecting the parts to each other to form the product.

11. The method of claim 10 further comprising:
manufacturing the product using the manufacturing product and process structure.

12. The method of claim 11, wherein manufacturing the product using the manufacturing product and process structure comprises:
creating instructions to assemble the parts using the manufacturing product and process structure; and
manufacturing the product using the instructions.

13. The method of claim 12, wherein the instructions are in a form for use by a human operator.

14. The method of claim 12, wherein the instructions are program code run by a computer system controlling manufacturing equipment assembling the parts and forming the product.

15. The method of claim 10, further comprising:
identifying a number of processes used to connect the parts to form the product; and
creating, using the number of processes used to build the product, a number of groupings of parts, wherein the manufacturing product and process structure comprises the number of processes and the number of groupings of parts.

16. The method of claim 15, wherein the number of groupings of parts forms a number of manufacturing assemblies.

17. The method of claim 10 further comprising:
generating, using the collision path, and displaying an exploded view of the manufacturing product and process structure in a graphical user interface in a display system in a human machine interface; and
receiving a user input, generated by an input system in the human machine interface, changing manufacturing information in the manufacturing product and process structure.

18. A computer program product specially programed to manufacture a product, wherein the computer program product comprises:
a computer-readable storage media;
first program code, stored on the computer-readable storage media, configured for execution by a computer system to cause the computer system to identify an engineering product structure for the product, wherein the engineering product structure comprises parts for the product listed in an order; and
second program code, stored on the computer-readable storage media, configured for execution by the computer system to cause the computer system to:
form, based upon a fastener data scheme and a manufacturing requirement, a fastener-based group that comprises selected fasteners and associated parts from among the parts as listed in the engineering product structure;
perform a part explosion trajectory for the parts for the product that indicates the fastener-based group;
revise the order of the parts as listed in the engineering product structure based upon a sequence number assigned, respectively, to each of the parts in the fastener-based group to form a build sequence within a manufacturing structure; and
create, based upon the engineering product structure, a clearance path, a collision path, and the build sequence within the manufacturing structure, a manufacturing product and process structure for parts connected in the product, wherein the manufacturing product and process structure comprises: the parts, and manufacturing information to connect the parts to each other to form the product.

19. The computer program product of claim 18, wherein the second program code comprises program code, stored on the computer-readable storage media, configured for execution by the computer system to cause the computer system to:
identify a number of processes used to connect the parts to form the product; and
create a number of groupings of parts based on the number of processes used to build the product, wherein the manufacturing product and process structure comprises the number of processes and the number of groupings of parts.

20. The computer program product of claim 19, wherein the number of groupings of parts forms a number of manufacturing assemblies.

\* \* \* \* \*